United States Patent
Ramakrishnan et al.

(10) Patent No.: US 10,109,012 B2
(45) Date of Patent: Oct. 23, 2018

(54) METHOD AND APPARATUS FOR REPRESENTING AND MODELING CONCEPTS IN FINANCE

(71) Applicant: topXight labs llc, Wilmington, DE (US)

(72) Inventors: Kirthi Kumar Ramakrishnan, Montclair, NJ (US); Sivakumar Visveswaran, Rochester, NY (US)

(73) Assignee: topXight labs llc, Wilmington, DE (US)

( * ) Notice: Subject to any disclaimer, the term of this patent is extended or adjusted under 35 U.S.C. 154(b) by 535 days.

(21) Appl. No.: 14/543,204

(22) Filed: Nov. 17, 2014

(65) Prior Publication Data

US 2015/0142698 A1   May 21, 2015

Related U.S. Application Data

(60) Provisional application No. 61/907,254, filed on Nov. 21, 2013.

(51) Int. Cl.
*G06Q 40/00* (2012.01)
*G06Q 40/06* (2012.01)

(52) U.S. Cl.
CPC .................. *G06Q 40/06* (2013.01)

(58) Field of Classification Search
CPC .............. G06Q 40/00; G06Q 40/06
See application file for complete search history.

(56) References Cited

U.S. PATENT DOCUMENTS

| | | | |
|---|---|---|---|
| 6,178,458 B1 * | 1/2001 | Wang | G06F 13/385 709/232 |
| 6,631,184 B1 * | 10/2003 | Weiner | H04L 12/2854 379/92.01 |
| 7,401,041 B2 * | 7/2008 | Goldfarb | G06Q 40/06 705/36 R |
| 7,472,084 B2 | 12/2008 | Damschroder | |
| 8,131,618 B2 | 3/2012 | Weinstein | |
| 8,401,953 B2 | 3/2013 | Mott | |
| 8,423,445 B2 | 4/2013 | Rotenberg | |
| 8,587,590 B2 | 11/2013 | Erickson et al. | |

(Continued)

FOREIGN PATENT DOCUMENTS

RU     2226296     10/2003

OTHER PUBLICATIONS

Pryke, Michael, "'What is Going on?' Seeking Visual Cues Amongst the Flows of Global Finance" Insighes, Durham University, Institute of Advanced Study, vol. 2, No. 2, 2009, 22 pgs.

*Primary Examiner* — Bruce I Ebersman
*Assistant Examiner* — Mark H Gaw
(74) *Attorney, Agent, or Firm* — Jaquez Land Greenhaus LLP; Bruce W. Greenhaus, Esq.

(57) ABSTRACT

A method and apparatus for presenting, managing and manipulating financial and econometric data are presented. The method and apparatus presented provide a virtual financial laboratory that allows a user to test and verify financial "Concepts". The disclosed method and apparatus allows a user to learn how to wisely invest money and manage investments based on an enhanced understanding gained through the testing and verifying of financial Concepts. Some of these embodiments are directed toward a method and apparatus for modeling and simulating events.

17 Claims, 19 Drawing Sheets

(56) References Cited

U.S. PATENT DOCUMENTS

| | | |
|---|---|---|
| 8,615,456 B2 | 12/2013 | Weinstein |
| 8,650,110 B2 | 2/2014 | Green |
| 2002/0046161 A1* | 4/2002 | Matsutani ............. G06Q 20/04 |
| | | 705/39 |
| 2002/0143949 A1* | 10/2002 | Rajarajan ............. G06F 9/5055 |
| | | 709/226 |
| 2003/0088492 A1* | 5/2003 | Damschroder ........ G06Q 40/00 |
| | | 705/36 R |
| 2005/0171881 A1 | 8/2005 | Ghassemieh et al. |
| 2006/0241949 A1 | 10/2006 | Tobias et al. |
| 2006/0288284 A1 | 12/2006 | Peters et al. |
| 2007/0156479 A1 | 7/2007 | Long |
| 2007/0156555 A1 | 7/2007 | Orr |
| 2007/0244783 A1 | 10/2007 | Wright et al. |
| 2009/0259580 A1 | 10/2009 | Castiglione et al. |
| 2011/0187711 A1 | 8/2011 | Giovinazzi et al. |
| 2012/0079431 A1 | 3/2012 | Toso |
| 2013/0297474 A1 | 11/2013 | Creamer et al. |
| 2014/0136381 A1 | 5/2014 | Ramya et al. |

* cited by examiner

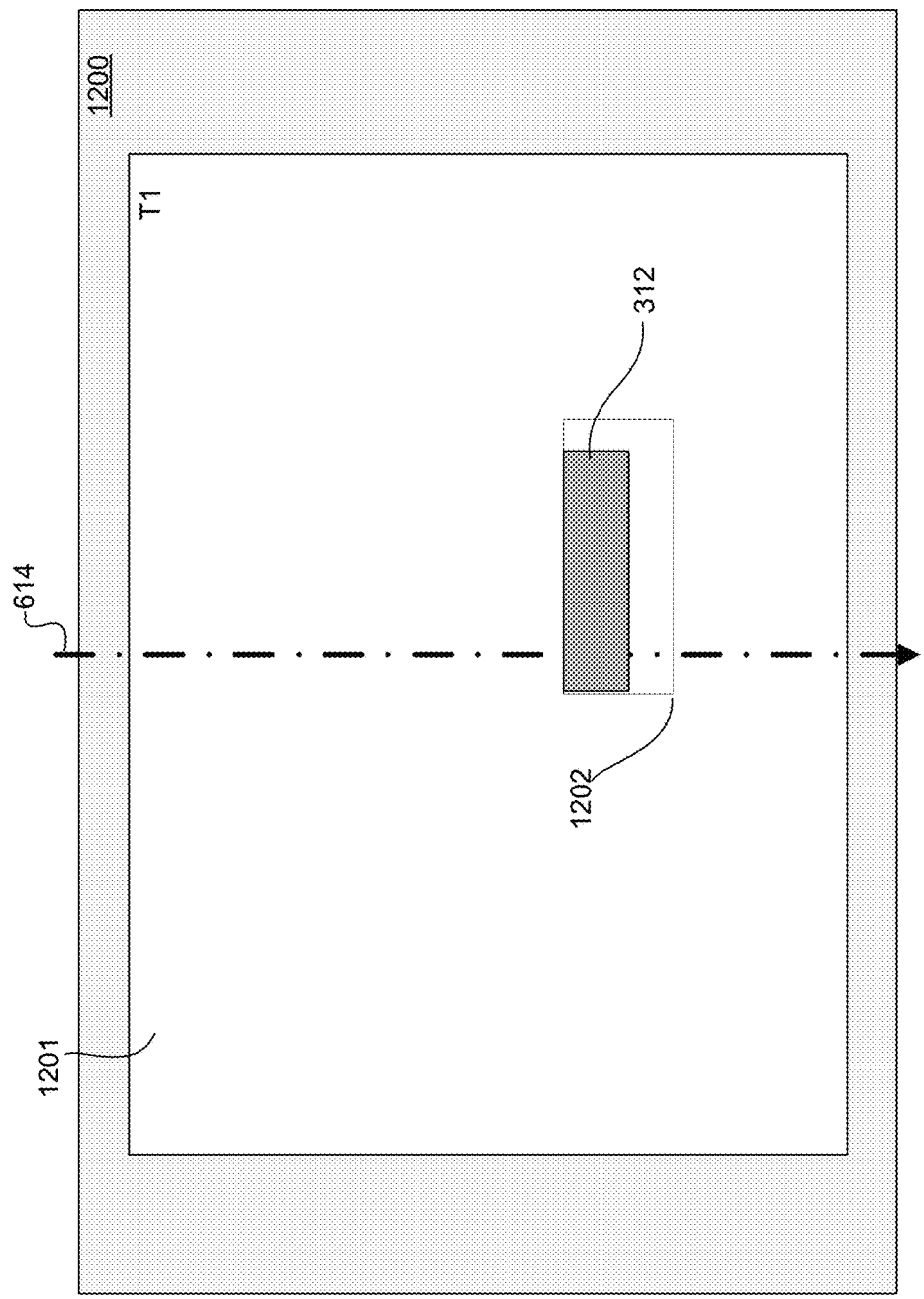

METHOD AND APPARATUS FOR REPRESENTING AND MODELING CONCEPTS IN FINANCE

RELATED APPLICATIONS

This application claims priority benefit of U.S. Provisional Patent Application Ser. No. 61/907,254 filed Nov. 21, 2013 and entitled "Systems and Methods to represent, manipulate and compute financial and econometric data and to model and verify concepts in finance", which is herein incorporated by reference in its entirety.

TECHNICAL FIELD

The disclosed method and apparatus relate to the field of computer modeling and simulation, and particularly, to systems and methods to represent, manipulate and compute financial data and to model and verify financial concepts related to such data.

BACKGROUND

Modeling complex relationships between data has been a goal of computer scientists since computers were invented. There are several fields in which data is collected and analyzed in order to understand the relationship between various categories and types of related data. By understanding the relationships between these various categories and types of data, an analyst can identify patterns and relationships that govern and/or predict changes to the data. However, such analysis typically requires a deep understanding of the field associated with the data. It also typically requires a substantial understanding of mathematics, statistics and computer science.

One area where this is particularly true is in finance. For example, in the field of finance, there is currently a trend away from defined benefit retirement plans. Consequently, there has been a shift toward individual responsibility for financial and retirement planning. This shift makes it critical for the average investor to have a better understanding of financial entities and the investable assets associated with them, as well as their attributes, their connections, and any causal relationships in the context of the overall financial system. Therefore, the average investor needs to be better informed regarding the effects of investment decisions based on underlying financial concepts or strategies. More specifically, the average investor needs a vehicle that can assist in learning how to make rational decisions in light of competing financial concepts. Such investors need to understand the validity and value of these underlying competing financial concepts in order to make wise investment choices. One way in which investors would be able to make better decisions is by using mathematical and statistical modeling to back test these concepts on real historical data and/or analyze the impact of these concepts using projected future data. Such financial concepts, and the associated statistical and mathematical techniques for back testing and projecting forward, are generally taught in college finance and economics courses and beyond. However a vast majority of the general population does not make it college, and hence are deprived of this very basic understanding that has practical implications to their financial security. This is but one example, among many, of the importance of accessible tools to understand and analyze concepts.

A unified system to understand and back test such financial concepts is not currently available to the average investor. Generally, it would be desirable for such a system to have a set of components or features to:

comprehensively depict data in the financial system across economic activity, accounting treatment, and capital markets;

view, choose and manipulate objects and their attributes within the financial system across multiple dimensions (for example, time), perform statistical, mathematical, and financial operations and modeling on such objects and attributes, present or incorporate a priori model(s) or concept(s) relating the behavior of the objects and their attributes, and simulate decisions and analyze their results.

The rate at which the average investor is likely to adopt such a system is likely to be far greater if presented in the context of a unified easy-to-use system having a graphical language environment in which data visualization is a key component. Furthermore, even if the system is not used directly by the average investor, the advantages of such a system will be an order of magnitude greater than what is presently available if used as a tool for investment consultants to communicate complex concepts when giving investment advice.

In general, the availability of such systems is limited, and within the available set, there are a number of limitations including, but not limited to:

the need for knowledge and skills pertaining to financial, mathematical, statistical, and data manipulation concepts, not commonly possessed by, or within the grasp of, the average investor;

the need for advanced programming techniques for data acquisition, transformation, processing, and statistical modeling, not commonly possessed by the general public;

the need to perform exceedingly manual and error prone processes and methods using general purpose spreadsheet applications;

a reliance on a disparate combination of general and special purpose tools, each catering separately to one or more of the components or features described above, and not compatible with one another, or capable of seamlessly working together;

the lack of a capability to present or construct an a priori model within the system, forcing the user to keep track of the same and associated data manually outside the system; and the lack of a comprehensive depiction of the financial system as described above, forcing the user to construct the connections between economic activity, accounting treatment, and capital markets.

There are currently computer applications and programs that allow an investor to monitor and manage their investments using graphical user interfaces to communicate information to the investor. One such program provides the user with spreadsheets and graphs of investments that allow the investor to track each investment and determine how each is doing.

Other prior art programs provide complex three dimensional color coded graphs and graphics that communicate complex information to the user in a form that is compact and user friendly. For example, one such program provides a three-dimensional landscape in which values for multiple series of received data points are shown in arrays of discrete graphical elements. Each discrete graphical element has a visual attribute that represents one of the observed market values. The three-dimensional landscape can be updated in real time based on updated market values. Another prior art program takes historical data and modifies a functional representation in order to determine the result of a counterfactual test. However, these programs fails to provide the user with a means by which the user can interact to test out particular concepts to be simulated in order to learn by doing. Furthermore, such programs do not create a uniform and coherent environment in which the user can navigate to explore and modify the data to be used in experiments and simulations.

Still further, such programs lack the ability to teach the user how to improve their skills in understanding complex underlying concepts that would allow an investor to improve the types of investments in which the investor might select systematically at the right point in time. Spreadsheets and charts that provide the investor with information about particular assets that the investor has already purchased or which the investor is considering investing are of significant value, but do not assist the investor in gaining an understanding of the nature of the concepts that are required in order to make prudent choices and purchases. While some computer programs provide projections into the future, which can assist an investor in making choices, the investor never gains any understanding of the reasoning behind the projections or the concepts that lead the program to make the projections. Furthermore, such programs do not provide a uniform and coherent environment in which the user can navigate.

Accordingly, there is presently a need for systems and methods that allow a person with minimal knowledge and skill in finance, math, statistics and data manipulation to experiment with concepts, learn how concepts impact particular decisions and how such concepts can guide investment decisions, navigate through a uniform and coherent environment in which parameters can be selected and adjusted to gain the maximum value from the learning experience and which can run simulations of particular concepts to train and educate the user.

SUMMARY

Various embodiments of the disclosed method and apparatus for presenting, managing and manipulating financial and econometric data are presented. The method and apparatus presented provide a virtual financial laboratory that allows a user to test and verify financial "Concepts". The disclosed method and apparatus allows a user to learn how to invest money and manage investments based on an enhanced understanding gained through the testing and verifying of financial Concepts. Some of these embodiments are directed toward a method and apparatus for modeling and simulating events.

The presently disclosed method and apparatus provides a user with a laboratory in which the user can experiment with purchases and sales of assets to assist the user in verifying particular financial Concepts and investment strategies. A user can run a simulation in which the user can select buy and sell points based on a Concept or strategy to be tested. The user can track gains and losses over time. In so doing, the user can validate or discount each Concept and associated strategy. Furthermore, by applying the Concept or strategy to various sets of data regarding objects of interest, the user can refine investment strategies based on particular financial Concepts. The following detailed description of the disclosed method and apparatus provides further details about the disclosed method and apparatus.

In accordance with one embodiment of the disclosed method and apparatus, data is maintained in a database. The data includes trading data for a number of investible assets, such as equities, bonds, commodities and other assets in which an investor can invest. The trading data includes "Attributes" related to particular assets, including information about trades made over a selected period of time, such as the ask and bid price for each asset and the volume of trades in each asset over a period of time. Additional data, such as the financial statements of companies that issued the asset, real world data regarding the nature of the business of the company that issued the asset (i.e., number of product lines, number of stores, number of employees, etc.), information regarding derivative products associated with the asset, etc.

The data available to the user can include historical data regarding actual companies and the assets associated with them, fabricated data prepared by experts based on historical data, or real time data received from a live feed from a financial institution. From this information, several other Attributes can be derived, including the volatility of the asset, the return on investment for purchases made at particular points in time, etc. Each asset is maintained as an "Object" that can be displayed using relative location, size, shape, color, spin, etc. to communicate the value of particular Attributes associated with the Object.

Objects are displayed in a multi-dimensional "Environment" comprised of a plurality of "Spaces". The user can navigate the Environment by moving from one Space to another to view different aspects and Attributes of the Objects. Each Space is defined and bounded by one or more two-dimensional "Cards" that can be manipulated within the Environment. In turn, Objects within the Card can be manipulated to convey the Attributes of the Objects being presented. Cards can be stacked to present a three dimensional Space in which the user can manipulate the Cards to select the Attributes that the user wishes to view. In some three-dimensional Spaces within the Environment, the third dimension is time. In this case, each Card in the Space is associated with a particular point in time. Each Card, therefore, conveys information about Attributes at the time associated with the Card on which the Attribute is presented. The user can then scroll through the stack of Cards in the Space to review the value of the Attributes presented over time.

In accordance with one embodiment of the disclosed method and apparatus, the user enters the Environment starting at a first Space. The first Space reveals a two dimensional Card. The Card is associated with a point in time. Objects representing assets having Attributes are presented on the Card. The Card indicates the value of the Attributes at a point in time associated with the Card. The Card may only have one Object, or it may have as many Objects as can fit within the Card. In one embodiment, the user can choose to verify a particular Concept. The number of Objects displayed on the first Card will be determined based on which particular Concept the user selected to verify and the complexity of the simulation. For example, in accordance with one embodiment of the disclosed method and apparatus, the user may elect to use a teaching algorithm that steps the user through a series of simulations to assist the user in understanding a particular financial Concept.

Simulations allow the user to view a series of Cards that form a moving picture indicating the changes in the Attributes over time. However, rather than running a simulation, the user can navigate the Environment to control which Cards the user is viewing. In accordance with one embodiment of the disclosed method and apparatus, by using gestures, the user can manipulate the Environment to show a series of Cards in which each Card represents a snapshot in time. The user can then select to group Objects to allow the user to track the group as a single Object. The user can also "connect" Objects to allow the user to view a graphical relationship between Objects, making it easier to track the relationship of the Objects over time. Furthermore, the user can choose to create new Attributes by using gestures to combine Attributes mathematically.

In accordance with one embodiment, if the asset is a stock, the Object that represents the stock is a rectangle. The height of the Object indicates the price of the stock at the time associated with the Card on which the Object is presented. The width of the Object indicates number of outstanding shares for the stock. The color of the Object indicates the particular industry in which the stock belongs. The shape of the Object indicates that it is a stock, as opposed to a bond, commodity or other type of asset.

This summary is not intended to disclose each and every feature of the disclosed method and apparatus, but rather to introduce some of the basic information regarding the nature of the disclosed method and apparatus. The detailed description that follows provides additional information about the aspects of the disclosed method and apparatus, including information regarding the structure and architecture of the apparatus used to perform the method.

BRIEF DESCRIPTION OF THE DRAWINGS

The disclosed method and apparatus, in accordance with one or more various embodiments, is described with reference to the following figures. The drawings are provided for purposes of illustration only and merely depict examples of some embodiments of the disclosed method and apparatus. These drawings are provided to facilitate the reader's understanding of the disclosed method and apparatus. They should not be considered to limit the breadth, scope, or applicability of the claimed invention. It should be noted that for clarity and ease of illustration these drawings are not necessarily made to scale.

FIG. 7 is an illustration of a Space in which the $Z_1$-axis is exposed after a right swipe from the Space (gesture to display Time dimension) shown in FIG. 6a.

FIG. 12 is an illustration of the Space that results from a left swipe over the Space shown in FIG. 10.

FIG. 14 illustrates the Space 1400 that results from this left swipe from the Space shown in FIG. 6a.

The figures are not intended to be exhaustive or to limit the claimed invention to the precise form disclosed. It should be understood that the disclosed method and apparatus can be practiced with modification and alteration, and that the invention should be limited only by the claims and the equivalents thereof.

DETAILED DESCRIPTION

Figure 1:
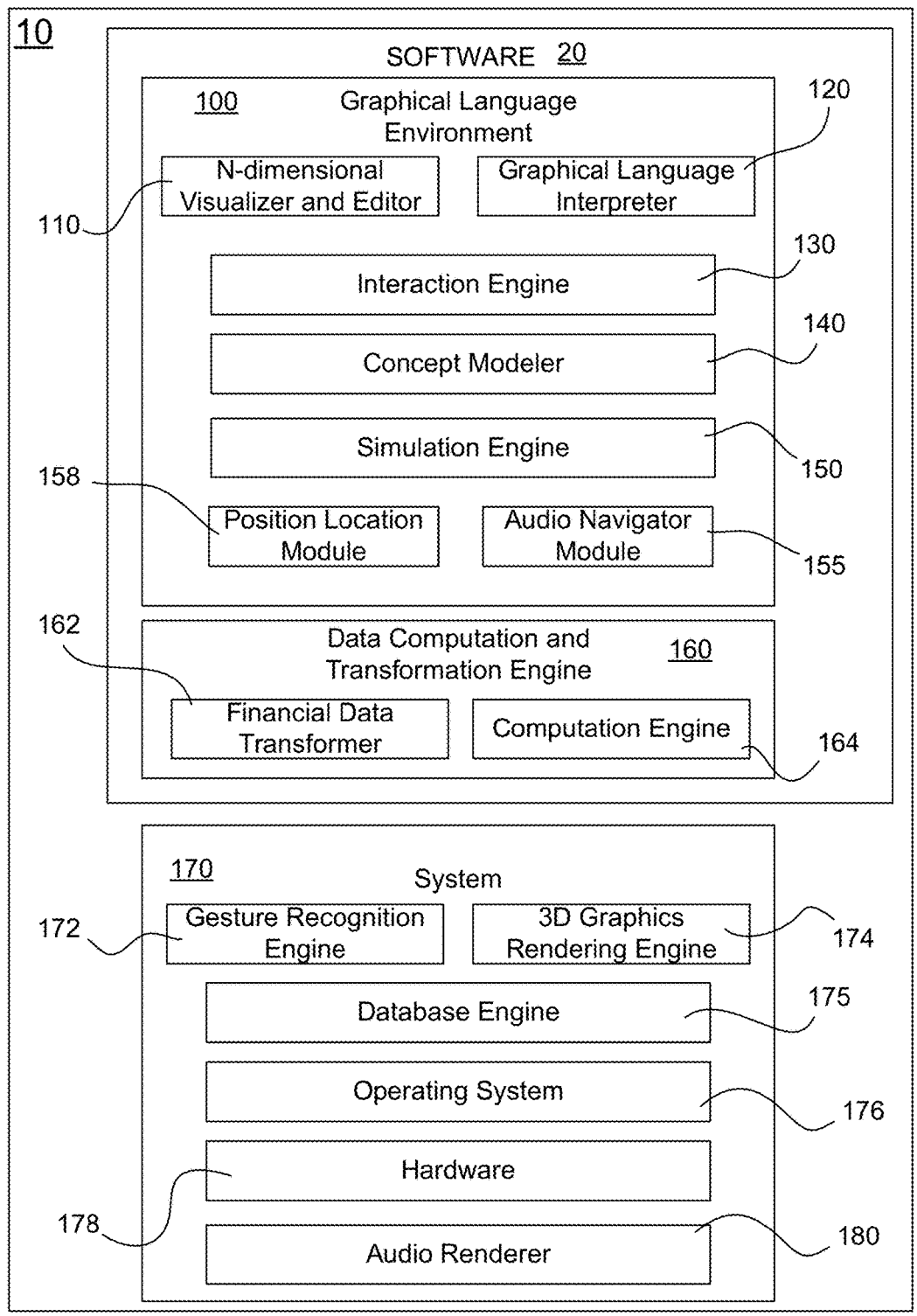
FIG. 1 is a simplified block diagram of one embodiment of the disclosed apparatus.

FIG. 1 is a simplified block diagram of one embodiment of the disclosed apparatus. The embodiment 10 shown in FIG. 1 comprises "Software" 20 and a "System" 170 on which the Software 20 is run.

One embodiment of the disclosed System 170 comprises a gesture recognition engine 172, a 3D graphics rendering engine 174, a database engine 175, an operating system 176, hardware 178, and an Audio Renderer 180. The System 170 provides a "device" on which the Software 20 runs. The disclosed engines 172, 174, 175, operating system 176 and hardware 178 of the System 170 may be implemented using conventional components performing the essentially conventional functions noted below. These functions are typically performed by tablets, smart phones, "phablets", laptop computers, desktop computers, or game consoles that: (1) have touchscreens, touchpads, motion sensors, motion controllers, or immersive virtual reality headsets; (2) have applications that use a database; and (3) can render graphics. Accordingly, those of ordinary skill in the art will understand these components without the need for further details. Nonetheless, where beneficial to aid in the understanding of the disclosed method and apparatus, additional details are provided below. It should be noted that at least some of the components of the System 170 comprise software that is executed within the System 170. Such software is distinct from and unrelated to the Software 20. Nonetheless, it will be clear that such software within the System 170 runs as part of the System 170 to support the operations of the Software 20.

The gesture recognition engine 172 accepts input in the form of gestures made by a user on a touchscreen. In one embodiment, the gesture recognition engine 172 includes the hardware associated with a touchscreen to capture gestures made by the user. In an alternative embodiment, the gesture recognition engine 172 is a software module run on the processor within the hardware 178. In one such embodiment, the gesture recognition engine 172 receives input from a hardware device with which the user directly interacts. The gesture recognition engine 172 interprets the gestures and provides an output to other components of the System 170 or the Software 20 to allow the user's gestures to be implemented. In one embodiment of the disclosed method and apparatus, a user can also provide input through an input device other than a touchscreen. In one such embodiment, the gestures are made by the user through a mouse, keypad or other user interface that resides within the hardware 178. In another such embodiment, the gestures can be performed without physical touch using a motion controller (e.g., Wii) or motion sensor (Xbox Kinect). In another such embodiment, the input-output environment may be provide through a virtual reality headset (such as the Oculus Rift). Whether input through the touchscreen or otherwise, gestures made by the user provide input to manage and control the Software 20.

The 3D graphic rendering engine 174 provides an output mechanism to allow the Software 20 to display the results of processes performed by the Software 20 to a user on a display. In accordance with one embodiment, the display provides images in three dimensions. In an alternative embodiment, the display is a conventional 2D display. In one such embodiment, a conventional two-dimensional video Card or similar video graphics engine within the hardware 178 is used. It should be clear, however, that any display device may be used to provide an output to the user.

The database engine 175 includes software used for storage, movement, transformation and calculation of data. The database engine 175 responds to commands from the Software 20, as will be discussed in more detail further below.

The operating system 176 can be any conventional operating system, for example, the iOS or Android Operating System that supports drivers and higher layer programs, as is well known in the art.

In accordance with one embodiment of the disclosed method and apparatus, the hardware 178 includes a processor, memory, and a display unit having a touchscreen interface. For the sake of simplicity, the processor, memory and display unit are not shown as discrete components in FIG. 1, but rather are included within the hardware 178. As noted above, in one embodiment of the disclosed method and apparatus, the System 170 does not have a touchscreen. Accordingly, the hardware 178 would not have a touchscreen interface. However, one such alternative embodiment has an appropriate user interface for accepting and processing user inputs from an alternative input device, such as a mouse, keyboard, etc.

In accordance with one embodiment of the disclosed method and apparatus, the Audio Renderer 180 within the System 170 generates audio assistance for a user in a selected language based on inputs from the Audio Navigator module. In accordance with one embodiment of the disclosed method and apparatus, the Audio Renderer 180 is implemented by an existing audio card within the System 180. Alternatively, the Audio Renderer 180 is implemented by an external audio device integrated with the System 170 to generate audio output.

In accordance with one embodiment, the Software 20 comprises a graphical language environment 100 and a data computation and transformation engine (DCTE) 160. The graphical language environment 100 includes an N-dimensional visualizer and editor (NDVE) 110, a graphical language interpreter (GLI) 120, an interaction engine 130, a concept modeler 140, a simulation engine 150 and an Audio Navigator Module 155.

The NDVE 110 represents a financial system as an N-dimensional Space within a graphical display to create an "Environment". As used within this disclosure, a financial system is defined as a set of parameters and values related to a group of financial entities and the assets associated with those entities and the relationships that govern the interaction between those parameters and values. A financial entity is defined as a publicly traded company, a fund, or any other asset or organization in which an investor can invest. Financial assets associated with a financial entity are represented as Objects within the Environment. The Environment includes all of the Objects, "Attributes" associated with the Objects, and the data related to the Objects and Attributes associated with the financial system. An Attribute is any information or data that is related to an Object, such as the price of an equity, the number of shares outstanding, the volume of trading in the equity, the number of outlets associated with the sale of a product sold by the company that issued the equity, etc.

The NDVE 110 provides a means by which to orient the graphical display and elements within the display. The NDVE 110 thus creates a "Space" within the Environment and provides a means to navigate within the Space. In accordance with one embodiment, navigating within the Space includes changing the dimensions of the Space, the scale with which a dimension is displayed in the Space, or the perspective (e.g., the angle at which, and distance from which, the user is viewing the information within the Space). The NDVE 110 accepts inputs from the gesture recognition engine 172 to allow such navigation and manipulation within the Space, including changing the dimensions that define the Space. A more detailed discussion of the manner in which the dimensions of the Space are defined and changed is provided further below.

The NDVE 110 also receives commands to perform arithmetic, geometric and statistical computations based on gestures made by a user. The NDVE 110 represents assets associated with financial entities, their supersets and subsets, their different manifestations as "Objects" having Attributes. In one embodiment, in addition to representing assets associated with financial entities (or groupings of financial entities) as Objects having Attributes, the NDVE 110 can display a line from one Object to another to provide a visual connection between the Objects and thus aid the user in tracking the relationship between the connected Objects. The manner in which the NDVE 110 displays the Space will be discussed in further detail below.

The GLI 120 receives gestures from the NDVE 110. The GLI 120 translates the received gestures associated with Objects into one or more arithmetic or statistical operations in response to the particular "semantics" of the gesture. For example, a user may place his finger over a graphical representation of an Object or Attribute and by sliding his finger across the display, drag the Object or Attribute to a graphical representation of another Object or Attribute. In response, the GLI 120 will interpret the gesture as a command to divide the value of the first Object or Attribute by the value of the second Object or Attribute. In accordance with one embodiment of the disclosed method and apparatus, if the GLI 120 determines that a mathematical, statistical or data transformational operation is to be performed, the GLI 120 will invoke the DCTE 160 to perform the operation. Further examples of how the user can manipulate the information presented will be discussed further below.

The interaction engine 130 receives input from the gesture recognition engine 172. In response to the received input, the interaction engine 130 invokes the gesture recognition engine 172, the 3D graphics rendering engine 174, the database engine 175, the DCTE 160 and the simulation engine 150 to each do the tasks associated with that particular engine in proper order. Thus, the interaction engine 130 controls and manages the operation of these engines 172, 174, 175, 160, 150.

The concept modeler 140 maintains a repository of axioms and defined rules. These axioms and defined rules are used to define financial "Concepts". A financial Concept is a set of rules defining relationships between Objects and Attributes within the Environment. In particular, a Concept indicates how current and past relationships between Objects and their Attributes will predict the values and trends associated with the Objects and their Attributes in the future. For example, one Concept might hold that equities that have consistently performed well in the past 3 months will likely continue to perform well for the next month and that equities that have not performed well in the past 3 months will likely continue to underperform in the next month.

The concept modeler 140 applies the axioms and rules to establish empirical relationships between different Attributes, between Attributes and Objects, and between one Object and another Object or between the Attributes of two different Objects. In some cases, Concepts may define such relationships that exist between several Objects and/or Attributes. Such Attributes may be used either alone or in combination with other Attributes. In accordance with one embodiment of the disclosed method and apparatus, the concept modeler 140 manages required data inputs, processing rules and expected outputs associated with particular Concepts.

The simulation engine 150 selects Concepts defined by the concept modeler 140 and performs operations associated with such selected Concepts. In one embodiment, the simulation engine 150 can implement such selected Concepts repeatedly and in varied ways to create and perform simulations in response to a gesture or combination of gestures implemented by the user. In one embodiment, the simulation engine 150 represents the results of implementing a simulation. The simulations implement Concepts that follow associated axioms and defined rules that define the Concepts implemented within the simulation. A simulation of a Concept can be run and the results of the simulation can be reviewed by implementing a rewind or playback function. Such rewind and playback functions reverse the operations performed by the simulation in order to allow a user to repeatedly review the results of simulations performed by the simulation engine 150. In accordance with one embodiment, gestures by the user can be used to control the speed at which the simulation is performed. The simulation engine 150 interfaces with the DCTE 160 to request the DCTE 160 to perform operations on data, including statistical, mathematical and data transformations, required to implement the simulations defined by the simulation engine 150.

The Audio Navigator Module 155 provides context sensitive audio instructions and cues to the user to assist the user in interpreting the Environment. In accordance with one embodiment of the disclosed method and apparatus, the Audio Navigator Module 155 suggests suitable actions for the user based on what is happening in the Environment. For example, in one mode of operation, the Audio Navigator Module 155 will alert the user that the user's portfolio is losing value. In accordance with one embodiment, the Audio Navigator Module 155 will recommend selling some of the assets in the user's portfolio to control the losses. The Audio Navigator can also instruct the user on the use of specific strategies appropriate to a given market situation.

The Position Location Module 158 uses position location information provided by the Hardware 178 to determine particular settings to be applied. For example, if the user is in Asia, the data will relate to assets that are presented in the markets in Asia. Also, in accordance with one embodiment of the disclosed method and apparatus, visual motifs are modified to fit the cultural tastes and sensibilities of the particular location.

The DCTE 160 comprises a financial data transformer (FDT) 162 and a computation engine 164. The FDT 162 maintains and implements rules and algorithms used to store data and determine what data is to be displayed within the Space. The FDT 162 also retrieves data to be displayed. In one embodiment of the disclosed method and apparatus, the FDT 162 independently stores, retrieves and executes algorithms on data to "run" the Environment. In accordance with one embodiment of the disclosed method and apparatus, running the Environment includes ensuring that all Objects and Attributes are displayed in accordance with the definition of the Space and the gestures of the user that define the visible Space. The user calls upon such Objects and Attributes by making appropriate gestures to command the System 170 to reveal desired Objects and/or Attributes (e.g., selecting particular Objects and by assigning particular dimensions to the axes of the visible Space in which the Object is to be displayed).

The computation engine 164 executes algorithms that alter the values of Attributes consistent with financial Concepts. The computation engine 164 can execute such algorithms without depending on external run-time modules, features or components (i.e., without any run-time external dependencies or requirements).

Gestures are typically associated with displayed Cards, Objects and Attributes. Such gestures are received by the gesture recognition engine 172 within the System 170. The System 170 then communicates with the NDVE 110 within the Software 20 to provide the NDVE 110 with a command that is associated with the displayed Cards, Objects and/or Attributes upon which the calculation is to be performed.

The NDVE 110 also provides Attributes of assets associated with financial entities. Some examples of such Attributes of assets associated with financial entities include economic indicators, currencies, portfolios, etc. In addition, the NDVE 110 provides supersets and subsets of assets associated financial entities, such as markets, sectors, industries, etc. to which particular entities are a part. The NDVE 110 also provides Attributes of financial entities and their associated assets, such as price, return, size, earnings, etc. Still further, the NDVE 110 provides different manifestations of the assets associated with financial entities, such as stocks, bonds, derivatives, financial statements, etc.

For example, the company Yahoo has issued stock that is traded on the NASDAQ under the ticker symbol YHOO. Yahoo is in the "Internet Information Providers" Industry. Yahoo is also in the "Technology" sector. Additional information related to Yahoo's stock includes the Price/Earnings ratio (P/E), Market Cap, Volume of shares traded, Earnings per Share, etc. Accordingly, the Object "Yahoo" can be viewed in an X-Y plane presented on a Card in which the size of the Object displayed indicates the stock price and number of outstanding shares. In addition, the placement of the Object on the X-axis indicates the risk associated with the stock. The placement of the Object on the Y-axis indicates the percentage of return on the investment. Yahoo's Attributes include "Earnings" which can be viewed in a financial statement within an Accounting Realm. In addition, the price of the shares is shown in the Risk/Return Card. The user can create a permitted Attribute, "E/P ratio". The E/P ratio can then be viewed in sequentially presented Risk/Return Cards over time as the historical trend in E/P ratio for Yahoo along the Time dimension. These functions of the disclosed method and apparatus will be discussed in more detail below.

In one embodiment, Objects within the Space can be shown having selected shapes. The particular shape is used to denote the class of the Object. For example, in one embodiment, an Object that has a rectangular shape is an equity. An Object that has a triangular shape is a bond. Circles are used to represent a commodity. In one embodiment of the disclosed method and apparatus, the size of an Object is used to indicate the magnitude of the empirical value of the Object depicted. Color is used to indicate the industry of the entity associated with the asset represented by the Object. In one embodiment, spin is used to indicate the liquidity or trading volume of the Object. Furthermore, in one embodiment, relative scaling is used to indicate the denominated currency unit, such as dollars, Euros, etc.

In one embodiment, the NDVE 110 provides a visual representation of a connection or causal relationship between Objects and Attributes. The representation can be a line or other connecting shape. In some cases, the represented connection can be theoretical, while in other cases the relationship is empirical. The shape, color or other Attributes of the line or other connecting shape can provide information about the nature of the relationship.

Figure 2:
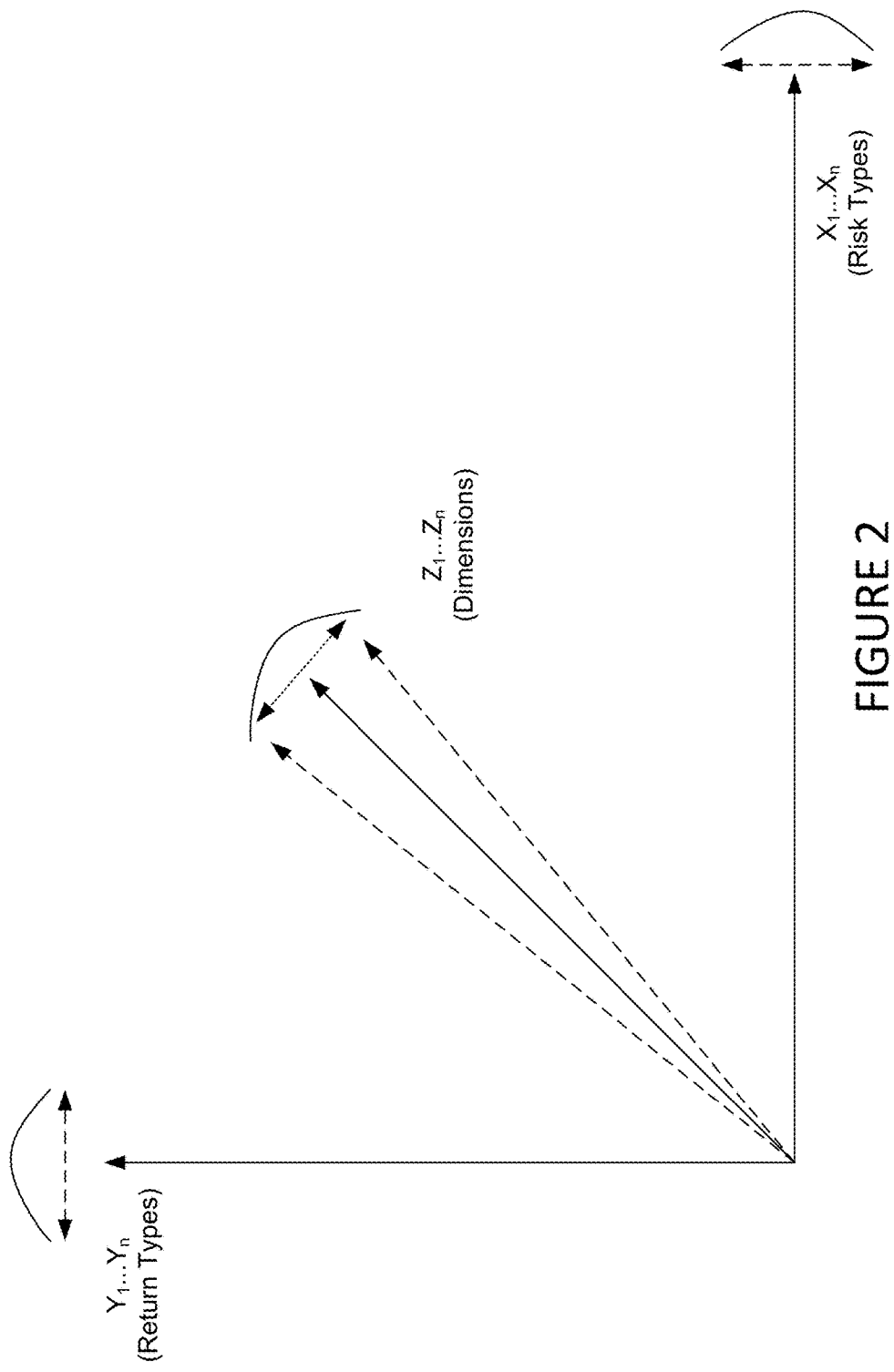
FIG. 2 is an illustration of the organizational layout of the data presented within the Space on the graphical display by a 3D graphics rendering engine in accordance with one embodiment of the disclosed method and apparatus.

FIG. 2 is an illustration of the organizational layout of the data presented within the Environment on the graphical display by the 3D graphics rendering engine 174 in accordance with one embodiment of the disclosed method and apparatus. The Environment and the Spaces within the Environment displayed by the presently disclosed method and apparatus remain uniform, consistent and coherent as various controls and commands are executed by the user to expose different information to the user.

In the context of the presently disclosed method and apparatus, the term "uniform" means that all of the Attributes associated with all of the Objects both currently being displayed and those Objects and Attributes that are not currently being displayed, are updated and maintained. The values of all such Attributes remain consistent and the relationships between the values of different Attributes remain intact as the user navigates the Environment. Therefore, if a first Attribute or Object currently in view is changed, any other Object or Attribute having a value that is interdependent with the changed value (i.e., having a value that would change as a result of a change in the value of the first Attribute or Object) will be updated to reflect the change caused by the change in value of the first Attribute or Object. This is true whether that related Object or Attribute is current being displayed or not. In addition, any changes that are made to an Attribute or Object remain as the user navigates through the Environment by changing the dimensions and/or realms. Still further, if the value of an Attribute or Object that is not in view changes by the execution of a Concept or simulation, any Object or Attribute having a value that is interdependent with the changed value will change as appropriate, whether currently displayed or not.

For the purposes of this disclosure, the term "coherent" means that any direction in which the user navigates can be reversed so that the user can move fluidly through the Environment in any direction, dimension or change of dimension. Accordingly, any change to the dimensions, perspective or scale of the Space being viewed can be reversed (typically by making a gesture that is the reverse of the gesture used to make the initial change).

Furthermore, for the purposes of this disclosure, the term "consistent" means each instance of a three dimensional Space generated within the Environment at and the Objects within that Space functions as a physical entity which can be explored through gestures that reveal views of the Space from different directions. These views are presented in the Environment as rotations, expansions, etc. that the user can view and thus understand without abstract reasoning. Since each Space and Object are treated as physical entity, they adhere to the laws of spatial geometry and physics.

In the embodiment shown in FIG. 2, the Y-axis represents return on investment (hereafter referred to as "return" for simplicity). There are several types of return that can be represented on the Y-axis. In accordance with one embodiment, return is initially presented by a default return type. Return types include, for example, (1) periodic return, (2) cumulative return, (3) price only return, (4) dividend yield, etc. The user can select from the various types of return by using a gesture to control the Space being displayed. In accordance with one embodiment of the disclosed method and apparatus, the user can place a finger down on the touchscreen on which the Space is displayed and slide the finger horizontally (i.e., perform a horizontal swipe). In one embodiment, the user swipes near the left edge of the Card to change the type of return. The distance that the user swipes his finger will determine which particular return type will be represented on the Y-axis. As the user swipes from left to right, the type of return will change from one return type to another going forward through a list of return types. If the user swipes back from right to left, the type of returns will change by moving backward through the list of return types. It should be understood that the particular gestures disclosed throughout the present disclosure are merely examples. Other gestures may be used to cause particular actions to be taken or functions to be performed.

In accordance with one embodiment of the disclosed method and apparatus, the X-axis represents risk. Similar to the manner in which the user selects from the available return types that can be represented in the Y-axis, the user swipes in the vertical direction to select a risk type. For example, the user can choose to have the X-axis represent (1) historical volatility, (2) implied volatility, (3) beta, etc.

In accordance with one embodiment of the disclosed method and apparatus, the user can set the Z-axis to represent time. Alternatively, the user can switch the Z-axis to a different dimension. This will be disclosed in more detail below. The Z-axis is selectively displayed. That is, the user can elect to view only one Card in a two-dimensional Space or to reveal several Cards along the Z-axis in a three dimensional Space. Each Card is a two-dimensional representation of the X-Y plane.

Figure 3:
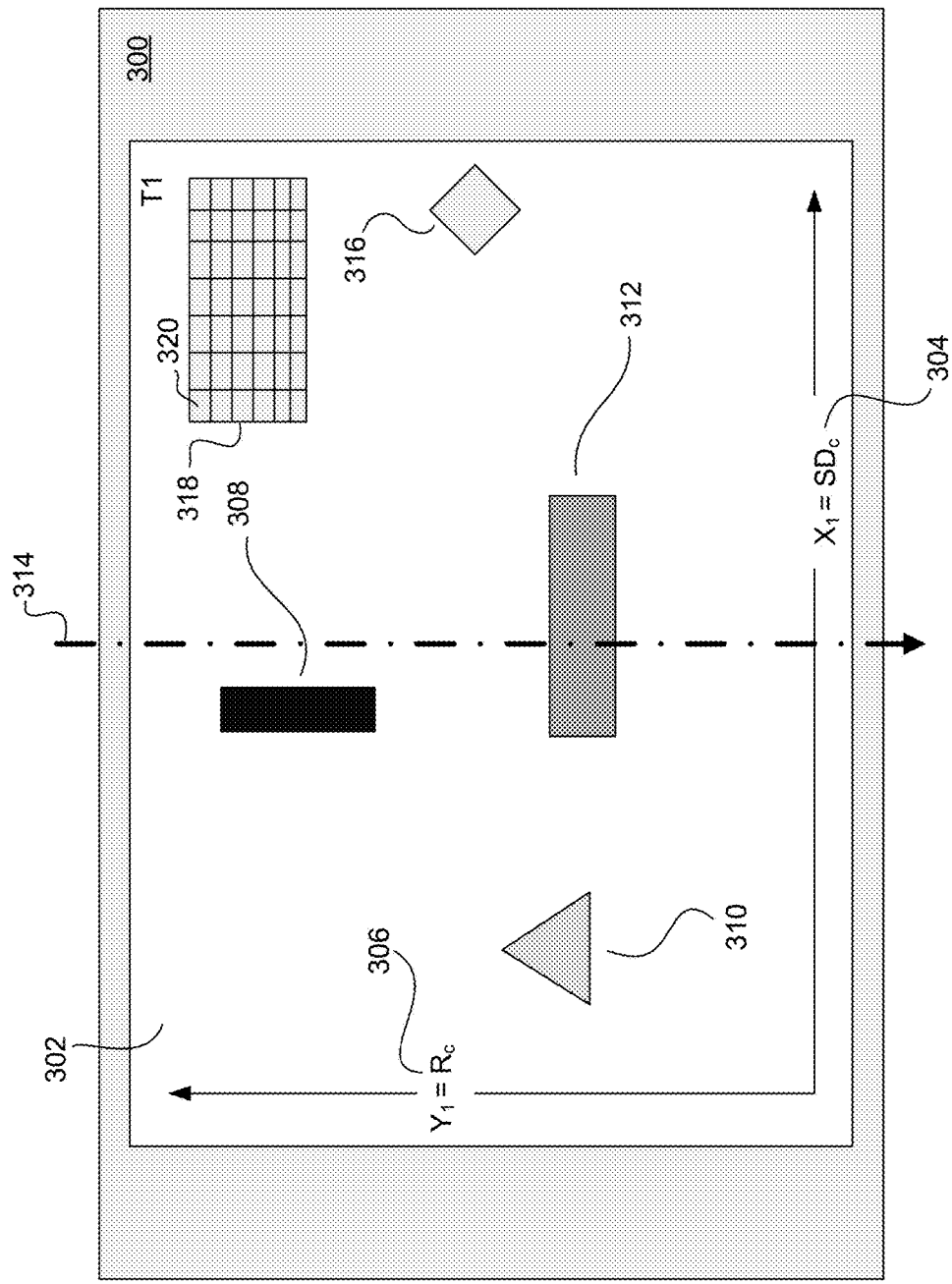
FIG. 3 is an illustration of a Space in which a single two-dimensional X-Y plane in the form of a Card is displayed.

FIG. 3 is an illustration of a Space 300 in which a single two-dimensional X-Y plane in the form of a Card 302 is generated by the NDVE 110 and displayed. In accordance with one embodiment, the X-axis 304 is assigned to represent volatility of cumulative returns ($X_1=SD_c$) and the Y-axis 306 is assigned to represent cumulative return ($Y_1=R_c$). In addition, three Objects 308, 310, 312 are represented on the Card 302. Each Object 308, 310, 312 represents a financial asset. The shape of the Objects 308, 310, 312 indicates the type of financial asset represented. For example, two of the Objects 308, 312 are rectangles, indicating that those Objects 308, 312 each represent an equity. The third Object 310 is a triangle. The triangular shape indicates that the Object 310 represents a bond.

The placement of each Object 308, 310, 312 along the X-axis indicates the relative risk in terms of volatility of the cumulative return for the asset. The placement of the Object 308, 310, 312 along the Y-axis indicates the relative cumulative return for the asset that is represented by that particular Object. In addition, the height of the Object 308, 310, 312 indicates an empirical value associated with the Object 308, 310, 312. Such empirical values include, for example, the price. The width of the Object 308, 310, 312 represents a different empirical value associated with the Object 308, 310, 312, such as the number of outstanding shares (if, for example, the Object is an equity). In accordance with one embodiment of the disclosed method and apparatus, the number of Objects presented on the Card 302 is controlled as a function of the particular Concept that is to be studied by the user. In accordance with one embodiment of the disclosed method and apparatus, the Space 300 is the starting point (i.e., first thing the user will see) upon entering the system.

In one embodiment of the disclosed method and apparatus, the user can use a gesture, such as a swipe across the middle of the screen from left to right, to reveal additional Cards on which other X-Y planes are presented. In accordance with one embodiment of the disclosed method and apparatus, an audio module provides audible feedback in the form of a voice or other audible queues to the user. For example, the user can place a cursor over an Object 308, 310, 312 in order to get audible feedback regarding the attributes associated with the Object 308, 310, 312. In addition, audible guidance can be provided to assist the user in navigating the Environment by providing specific instructions or suggestions to the user. Such audible feedback can be provided as the user navigates the Environment and executes particular simulations.

For the sake of brevity, descriptions of the particular audible output are not provided with the descriptions of each Space described below. However, it should be understood that such audible guidance is contemplated to be provided in order to assist the user in various ways throughout the user's trek through the Environment and as the user employs the simulation capability of the present method and apparatus. In accordance with one embodiment, such audible output includes instructions on how to move to adjacent Spaces, how to start a simulation, how to select particular concepts to be tested and other such helpful and useful information. In accordance with one embodiment, the audible output may also (or alternatively) include information to supplement or enhance the information provided in the particular Space which the user is currently viewing.

Figure 4:
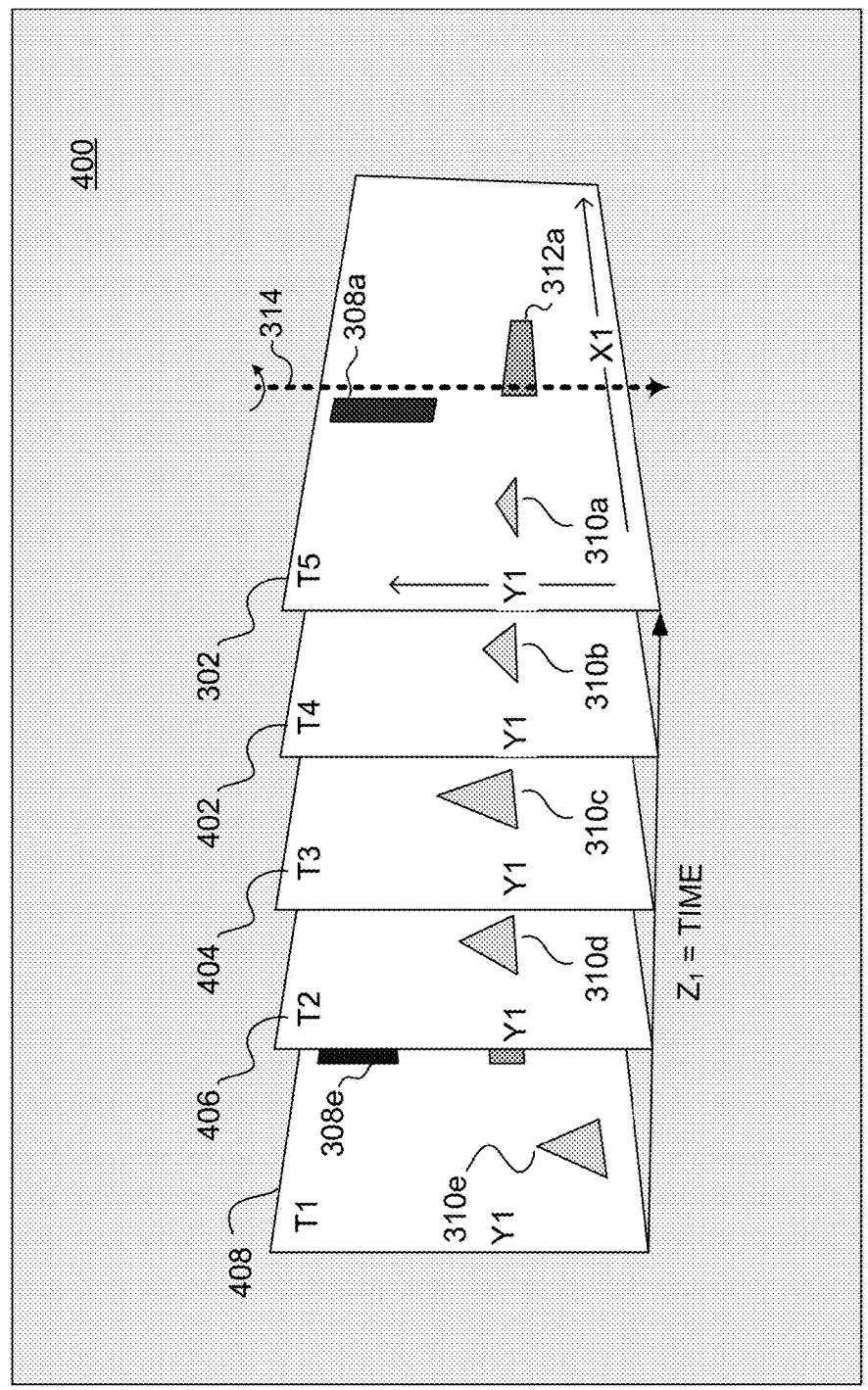
FIG. 4 is an illustration of a 3-dimensional Space projected in the graphical display after a user has swiped from left to right across the middle of the screen (gesture to display Time dimension) while displaying the screen shown in FIG. 3.

FIG. 4 is an illustration of a 3-dimensional Space 400 projected in the graphical display under the control of the NDVE 110 after a user has swiped from left to right across the middle of the screen while displaying the screen shown in FIG. 3. By using a swiping gesture, the user can navigate from the first Space 300 to the second Space 400. In one embodiment of the disclosed method and apparatus, a 3-dimensional Space 400 is presented using a 3-D capable display device. In an alternative embodiment, the 3-dimensional Space 400 is not presented on a 3-D capable display device. Rather, the 3-dimensional Space 400 can be represented on a two dimensional display using a perspective view, as is shown in FIG. 4, for example.

In accordance with one embodiment of the disclosed method and apparatus, after performing the left to right swipe, the $Z_1$-axis is revealed. The $Z_1$-axis is perpendicular to the X-Y plane of the Card 302. When the $Z_1$-axis is revealed by the rotation of the Card 302, a series of other Cards 402, 404, 406, 408, are revealed across the $Z_1$-axis. Each Card 302, 402, 404, 406, 408, displays the X-Y plane at a different point in time. The same Objects 308, 310, 312 and associated Attributes are shown in each Card 302, 402, 404, 406, 408. The values of the Attributes are conveyed based on the size, shape and the location of the Objects 308, 310, 312 with respect to the X and Y axes on each Card 302, 402, 404, 406, 408. The series of Cards 302, 402, 404, 406, 408 are shown with the first Card 302 laid on top of, and obscuring a portion of, the second Card 402. The first Card 302 is offset from the second Card 402 to reveal a portion of the second Card 402.

The Card 408 presents to the user the risk, return, price, and number of outstanding shares for the equities represented by the Objects 308, 312 at a time T1. In addition, the Card 408 shows the risk, return and price for the bond represented by the Object 310 at time T1. In accordance with one embodiment, the user selects what type of asset is shown on the Cards 302, 402, 404, 406, 408 (i.e., equities, bonds, commodities, etc.). However, the Cards will show only one type of asset at a time.

As the amount of risk and return changes over time, the location of the Objects 308, 310, 312 changes in each Card 302, 402, 404, 406, 408. In addition, as the price and number of outstanding shares changes for the Objects 308, 312, the height and width of the Objects 308, 312 change over time (i.e., from Card to Card). In accordance with one embodiment, the user can select the frequency to be applied across the $Z_1$-axis by using a gesture, such as a pinching or spreading of the thumb and forefinger along the $Z_1$-axis. Setting the frequency can be used in one embodiment of the disclosed method and apparatus to determine the frequency of the data over the time of any simulation to be performed. In accordance with one embodiment, the gesture recognition engine 172 causes the NDVE 110 to adjust the amount of time between adjacent Cards in response to the user gesture. The gesture recognition engine 172 will also instruct the NDVE 110 to adjust the amount of time between the first Card 302 and the last Card 408. Alternatively, the user can enter parameters through a keyboard, motion controller, motion sensor, VR headset, or other data entry device. Accordingly, the user can select the amount of time between adjacent Cards 302, 402, 404, 406, 408.

The user can scroll along the $Z_1$-axis through the Cards to reveal additional Cards and bring a different Card to the front by swiping or dragging a finger over the Cards 302, 402, 404, 406, 408 in the direction that the user wishes to traverse the $Z_1$-axis. For example, if the user wishes to see a Card representing a point that is later in time, then the user swipes or drags starting with his finger on one of the Cards and moving diagonally down and to the right. If there are additional Cards to be displayed that represent later points in time, then those additional Cards will be revealed as a function of the motion of the user's swipe. If the user wishes to reveal Cards from an earlier time, then the user places his finger on one of the Cards 302, 402, 404, 406, 408 and swipes or drags diagonally up and to the left. The user can set a time scale for an analysis by scrolling along the Z axis and tapping the Card(s) signifying the start and end date of the time series. Accordingly, the user can select the amount of time between the first Card 302 and the last Card 408 displayed in the Space 400.

The user can swipe once again from left to right across the middle of the screen. The gesture recognition engine 172 instructs the NDVE 110 to cause the Space to pivot about the central vertical axis 314. That is, each of the Cards 302, 402, 404, 406, 408 turns ninety degrees about its respective Y-axis.

Figure 5:
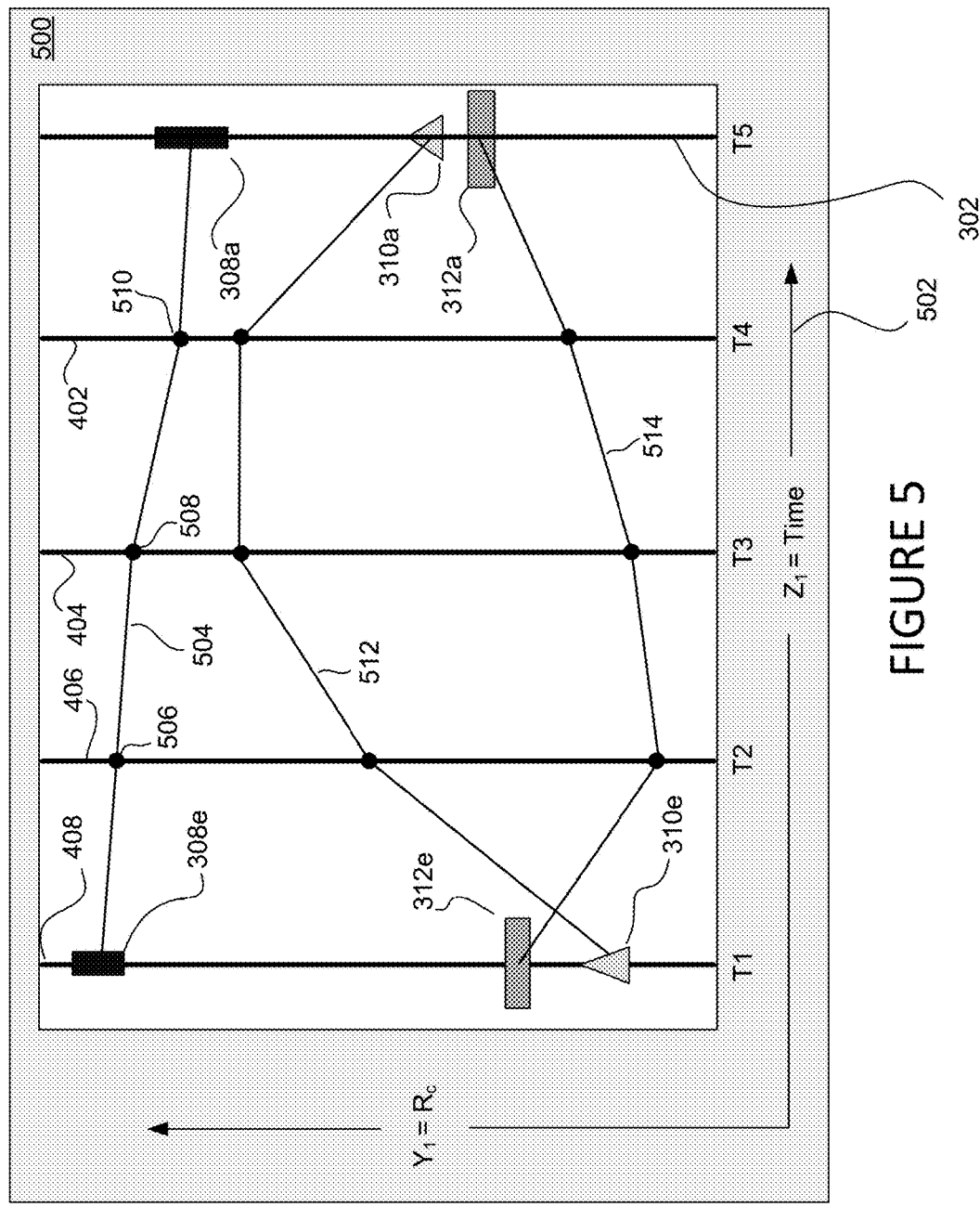
FIG. 5 illustrates a Space that is shown after a left to right swipe is performed across the screen (gesture to make Time as the X-axis in the plane) of FIG. 4.

FIG. 5 illustrates the result of such a left to right swipe performed across the screen of FIG. 4. The resulting display is a two-dimensional Y-Z plane in the Space 500 in accordance with one embodiment of the disclosed method and apparatus. It should be understood that the particular gesture used to reveal the Space 500 is disclosed here as one example. In alternative embodiments, other gestures could be used to reveal the Space 500. Furthermore, the particular set of Cards and order in which the Cards are animated are presented as one example, which may not hold for alternative embodiments of the disclosed method and apparatus, provided the representation is consistent, by geometry and physics, to the representation from where in Space 400 where the user came.

The return on investment for each Object 308, 310, 312 continues to be represented vertically in the Space 500, but time (on the $Z_1$-axis 502) is now represented horizontally in the Space 500. That is, each of the Cards 302, 402, 404, 406, 408 have been rotated ninety degrees. Accordingly, each is shown as a line 302, 402, 404, 406 408 representing the side of each Card in FIG. 5, with each of the Cards 302, 402, 404, 406, 408 rotated such that the X-axis runs perpendicular to the plane of the display. The line 302 is displayed on the right side of the Space 500, indicating that it carries the most recent values for the Objects 308, 310, 312 (values at time T5). A first Card 408 is located on the left side of the Space 500 to indicate that it is the earliest in time T1. A line 504 is generated by the NDVE 110 in response to the user gesture that navigates to the Space 500. The line 504 starts at the center of the Object 308e and runs through each of the points 506, 508, 510 representing the position of the Object 308d, 308c, 308b on each Card 402, 404, 406 terminating in the center of the Object 308a. The line 504 provides the user with a plot of the return for the Object 308 over the time from T1 to T5. Similar lines 512, 514 connect the return values at each point in time T1-T5 for the other two Objects 310, 312.

In accordance with one embodiment of the disclosed method and apparatus, a rectangle 308e is displayed superimposed over the Card 408 to assist the user in identifying the particular Object 308 corresponding to the line 504. Similarly, a rectangle 308a is displayed superimposed over the Card 302 at the end of the line 504. Alternatively, a label can be used to associate the lines 504, 512, 514 with the corresponding Objects 308, 310, 312. In yet another embodiment, the rectangle can be used only at the beginning of the line 504 or only at the end of the line 504. In another embodiment, the representation in Space 500 may be generated in an animated fashion with the rectangle moving from left to right in the direction of animation.

By swiping from right to left across the middle of the screen shown in FIG. 5, the user can return to the Space 400 portrayed in FIG. 4. A second swipe from right to left will return the user to the view portrayed in FIG. 3. Accordingly, the user can navigate back and forth through the three-dimensional X-Y-Z Space, altering the orientation of the reference frame to view the Space in: (1) the orientation shown in FIG. 3, in which a single Card is shown; (2) the orientation shown in FIG. 4, in which several Cards are shown along the Z-axis; and (3) the orientation shown in FIG. 5, in which the reference frame is rotated to show the Space 500 as a Y-Z plane.

Figure 6A:
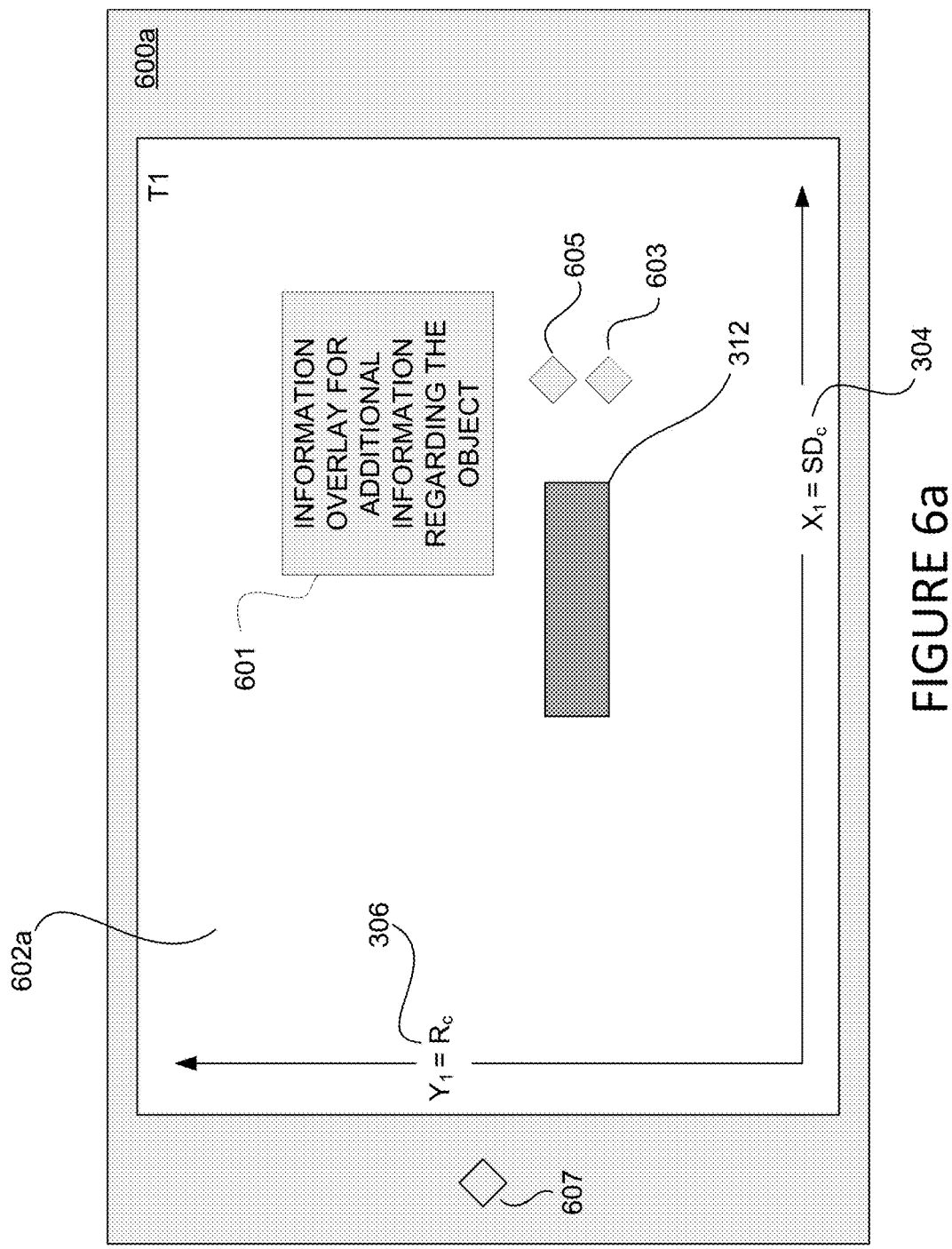
FIG. 6a shows a Space after the user has tapped an Object.

From the point within the Space 300 shown in FIG. 3, the user can tap the center of an Object 312 to isolate the Object 312. In one embodiment of the disclosed method and apparatus, an Object can be a higher level Object that represents a higher level asset. The higher level asset is a composite of other lower level assets. For example, an Object can be: an index fund; a composite of an industry; a sector or other such portfolio; or grouping of lower level assets (such as individual equities). FIG. 6a shows a Space 600a after the user provides a user gesture associated with an Object 312, such as tapping the Object 312. The Object 312 is shown isolated on a Card 602. The Card 602 is similar to the Card 302 in which the X-axis represents a particular type of return and the Y-axis represents risk. Particular operations can be performed on the Object 312 in the Space 600a. Furthermore, additional information about the Object 312 can be presented to the user in this view of the Object 312. For example, in one embodiment, an information overlay 601 can be displayed that includes information regarding the Object 312. Additionally, buttons 603, 605, 607 or other controls can be provided in the Space 600a to allow the user to perform operations on the Object 312.

Figure 6B:
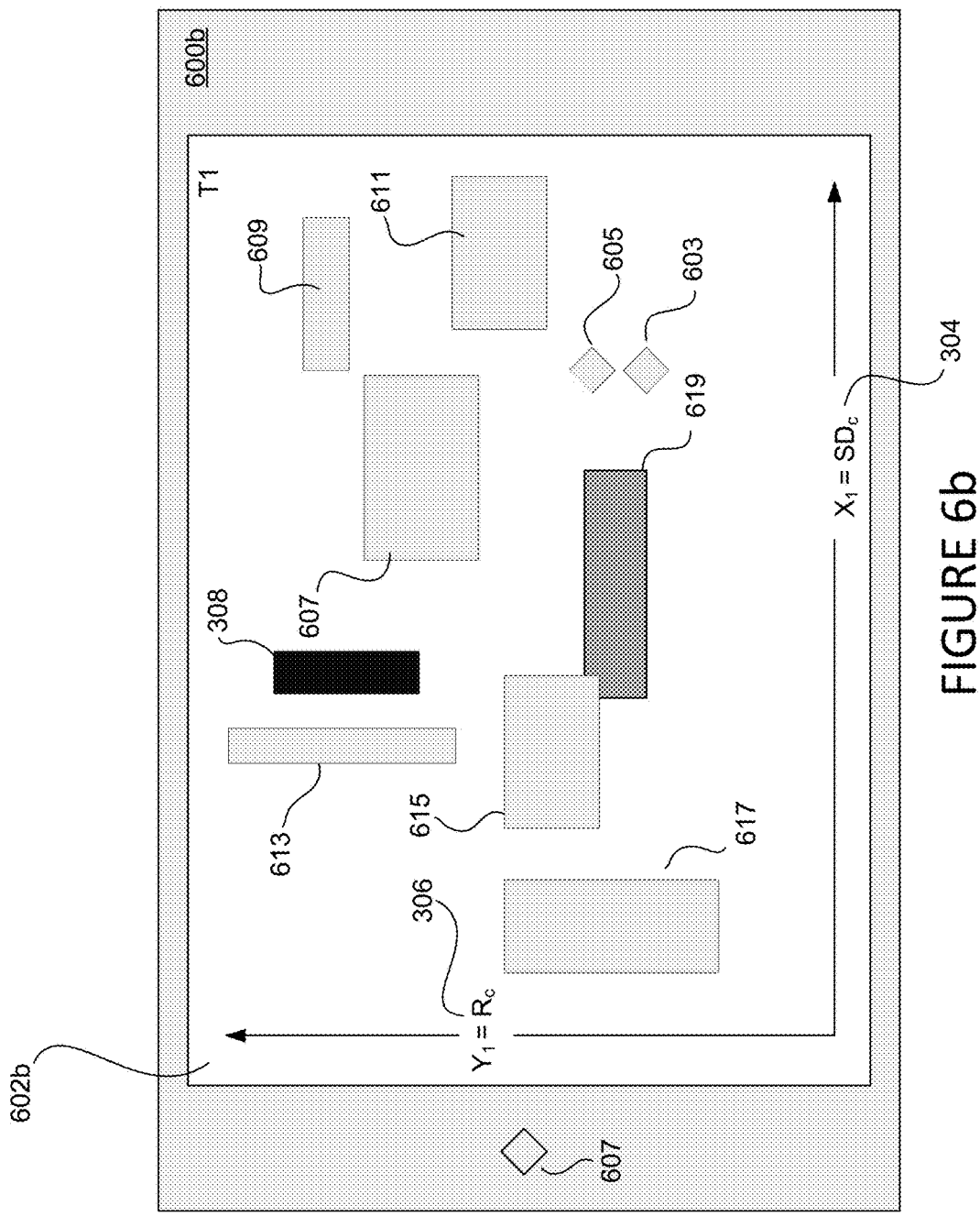
FIG. 6b is an illustration of a Space that results from the user making a downward swipe on an Object or Card that is a composite of lower level Objects.

FIG. 6b is an illustration of a Space 600b that results from the user tapping a higher level Object 308 that is a composite of lower level assets represented by lower level Objects 607, 609, 611, 613, 615, 617, 619. In response to a user gesture, such as the user swiping down on the higher level Object, each of the lower level Objects is displayed independently on the Card 602b. By swiping up from the Card 602b, the user can return to the Card 302 in which each of the lower level Objects 607, 609, 611, 613, 615, 617, 619 are again represented by the composite higher level Object 308. The user can then select a different higher level composite Object (such as the bond 310) and swipe down on that Object to reveal the lower level Objects that represent the lower level assets that make up that composite higher level Object. It should be understood by those skilled in the art that other user gestures can be used. For example, the user can use a spreading gesture in which the user places a thumb and middle finger on a touchscreen in relatively close proximity and then spreads them apart, provided that the gesture does not conflict with some other action for the same gesture in that Space.

In accordance with one embodiment of the disclosed method and apparatus, the user can swipe down to un-nest any number of nested levels of composite Objects. For example, swiping down on the first Object may reveal a first level of lower level Objects 607, 609, 611, 613, 615, 617, 619. If at least one of these first lower level Objects is itself a composite of one or more second lower level Objects, the user may then swipe down on an Object to reveal the second lower level Objects. For example, in one such case the higher level Object may be an index that includes at least a first lower level Object, such as an industry sector. The first lower level Object may include several second lower level Objects, such as equities issued by individual companies, wherein the industry sector is a composite of those equities.

Figure 7:
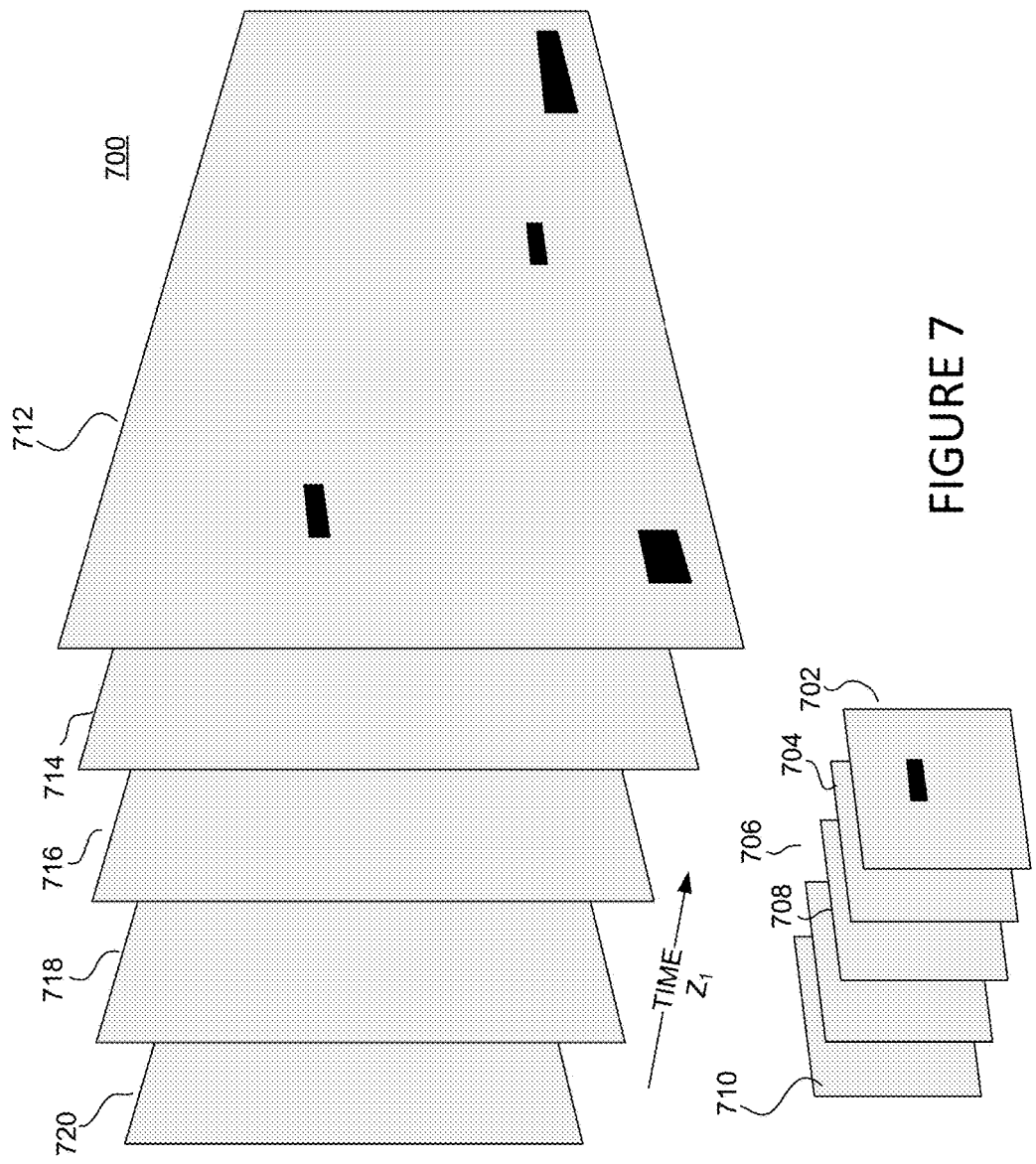

By swiping from left to right through the middle of the display, the user can expose the $Z_1$-axis. FIG. 7 is an illustration of the Space 700 in which the $Z_1$-axis is exposed after a right swipe from the Space shown in FIG. 6a. When exposed in this manner, the $Z_1$-axis represents time. Accordingly, several Cards 702, 704, 706, 708, 710 on which the Object 312 is displayed are exposed. In one embodiment, the Cards 702, 704, 706, 708, 710 on which the Object 312 is isolated are smaller. In addition, several associated larger "parent" Cards 712, 714, 716, 718, 720 are exposed. All of the other Objects (i.e., Objects other than the Object 312) that were present in the Space 300 (see FIG. 3) when the user taps an Object to create the Space 600 (see FIG. 6a) are shown in the Space 700 on the Cards 712, 714, 716, 718, 720.

Figure 8A:
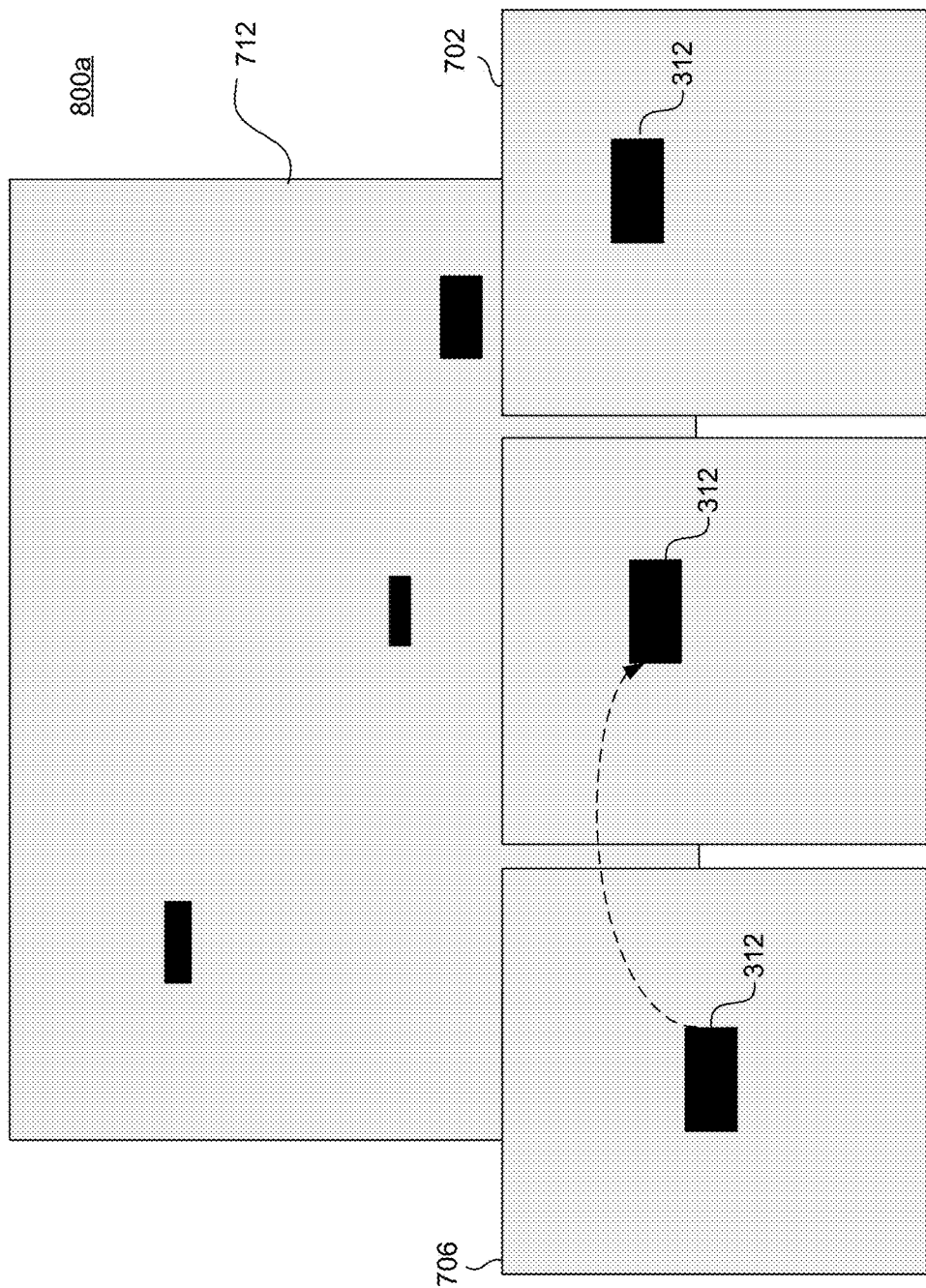
FIG. 8a is an illustration of a Space in which the user has swiped to the right from the Space of FIG. 7.

Another swipe to the right will cause the parent Card 712 to rotate to face forward. FIG. 8a is an illustration of the Space 800a in which the user has swiped to the right from the Space 700 of FIG. 7. Once the parent Card 712 rotates to face forward, each of the other Cards 714, 716, 718, 720 are hidden behind the Card 712. In addition, three of the smaller Cards 702, 704, 706 also rotate to face forward and spread out across the bottom of the Space 800a. In an alternative embodiment, either more or less of the smaller Cards 702, 704, 706, 708, 710 on which the Object 312 is isolated will be exposed in the Space 800a.

Figure 8B:
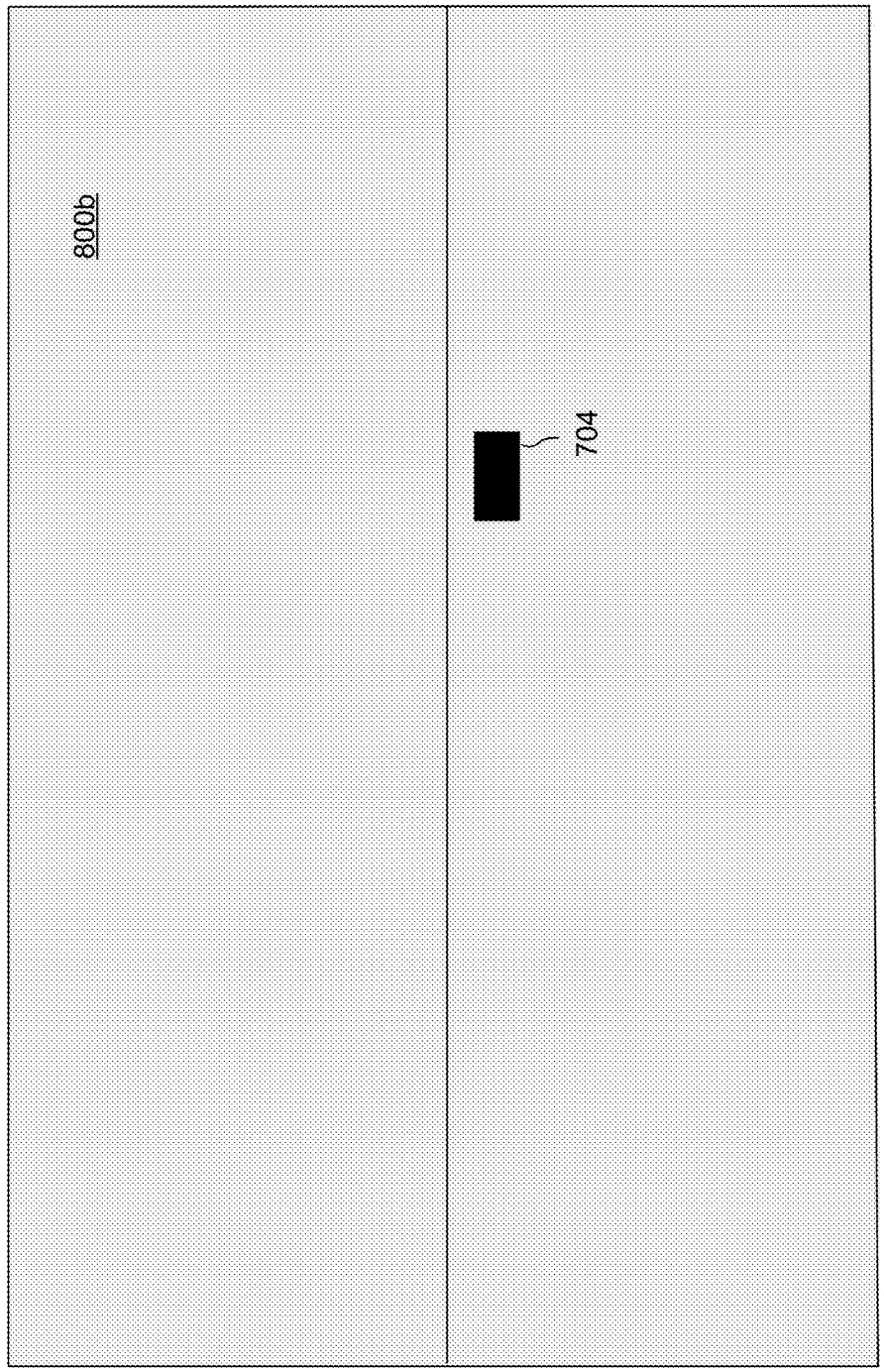
FIG. 8b is an illustration of a Space in which a new Attribute is displayed.

The Space 800a shown in FIG. 8a allows the user to select a first Attribute from a first point in time and generate a new Attribute that relates the first Attribute to a second Attribute at a second point in time. Accordingly, the user can do linear regression analysis and other types of analysis that require tracking an Attribute over time. For example, the user can create a new Attribute for relative growth over time. By dragging the right or left edge of Object 312 from a Card 706 that represents the price at a first point in time over to the Object 312 as represented in a Card 704 at a second point in time (as indicated by the dashed line 802), the difference between the price at the first time and the price at the second time can be created as a new Attribute dT. The new Attribute can then be divided by the amount of time between the two Cards 706, 704 to create a new Attribute dT/T. FIG. 8b is an illustration of a Space 800b in which this new Attribute can then be displayed. If the value of dT/T is positive, then the Object 804 is shown above the line 806. If the value of the Attribute dT/T is negative, then the Object 804 is shown below the line 806. The relative distance from the line 806 indicates the magnitude of the value of dT/T. In accordance with one embodiment, the color of the Object 804 indicates whether dT/T is positive or negative. In another embodiment, whether the Object is solid or presented in outline indicates whether the value of dT/T is positive or negative.

Alternatively, newly created Attributes can be displayed next to the Object 312 on each Card 702, 704, 706. In addition, by dragging the Attribute displayed on the Cards 702, 704, 706 up to the parent Card 712, the new Attribute can be generated for each of the other Objects that are exposed on the Card plane 712. Accordingly, by navigating back through the Environment, a different Object can be isolated on the Cards 702, 704, 706. When so isolated, the different Object will have the new Attribute associated with it on the Cards 702, 704, 706.

For example, from the Space 800a, the user can left swipe once to get back to the Space 700 shown in FIG. 7. Then the user can left swipe a second time to get back to the Space 600a shown in FIG. 6a. The user can then rotate in the opposite direction from that used previously to get back to the Space 300 shown in FIG. 3. Once back at the Space 300, the user can select a different Object 310 to be isolated in the Space 600a. The new Attribute that was created in the Space 800a will be displayed in the Space 600a. From the Space 600a, the user can right swipe once to get to the Space 700 and a second time to get to the Space 800a.

Figure 9:
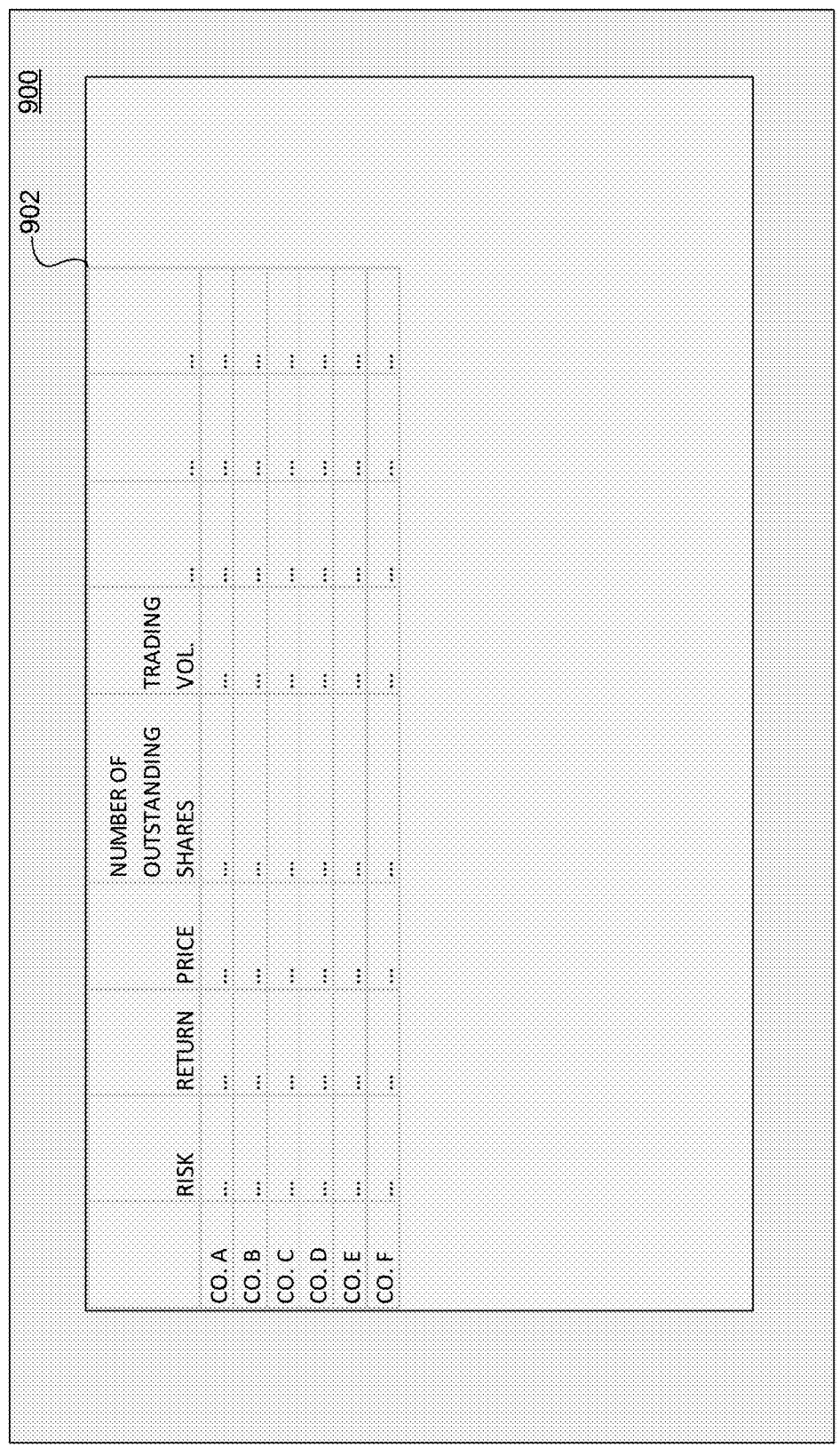
FIG. 9 is an illustration of a Space that is shown when a user makes a pivot gesture from the Space shown in FIG. 3.

Returning now to the Space 300 in which the entire market of interest is shown (see FIG. 3), the user can make a "pivot" gesture to expose a Space in which the market is shown in a tabular view (e.g., in a spreadsheet view). FIG. 9 is an illustration of the Space 900 that is exposed when a user makes a pivot gesture from the Space 300. A pivot gesture is made by placing the tip of the user's thumb and the tip of one or more fingers on the touch screen. The user then twists his wrist to rotate the fingers with respect to the thumb. In the Example shown in FIG. 9, the Space 300 from which the user made a pivot gesture had six Objects exposed within the market of interest. In this example, these Objects included equities for six companies named "CO. A", "CO. B", "CO. C", "CO. D", "CO. E" and "CO. F". As can be seen from FIG. 9, a spreadsheet is presented in Space 900 having the names of the companies associated with the equities at issue down the left-most column and the Attributes that are associated with each equity across the top row of the spreadsheet.

Pivoting in the opposite direction from the Space 900 will expose the Space 300 once again. If the user swipes to the left from Space 300 shown in FIG. 3, the Card 302 will rotate about its central vertical axis 314 clockwise looking down on the axis of rotation 314.

Figure 10:
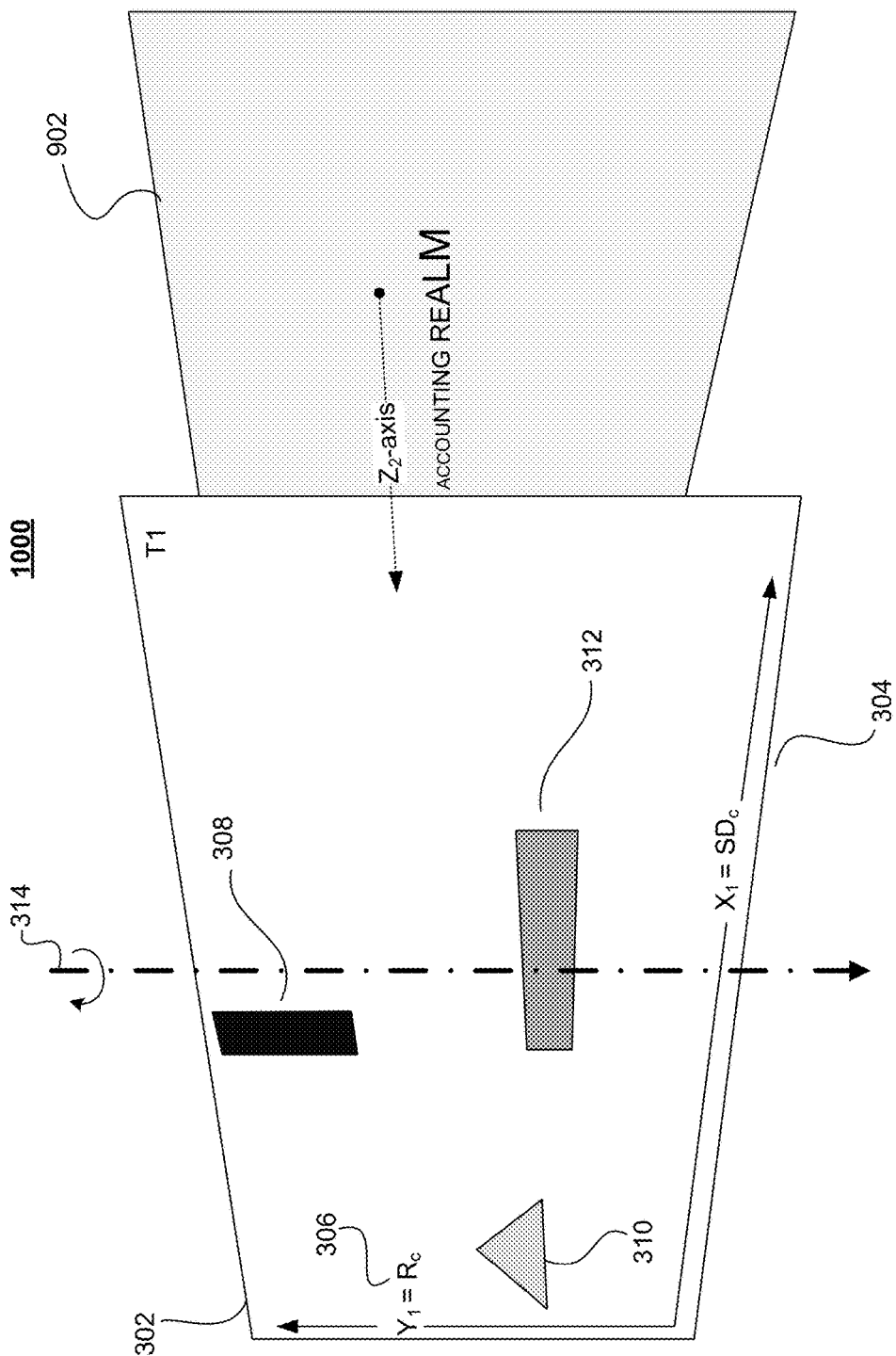
FIG. 10 is an illustration of a Space that is shown after a left swipe (gesture to display Information dimension) from the Space shown in FIG. 3.

FIG. 10 shows the Space 1000 that is exposed by a left swipe from the Space 300. The Card 302 will rotate approximately 45 degrees about the central vertical axis 314, exposing the $Z_2$-axis that runs perpendicular to the Space 300. The $Z_2$-axis is the Information dimension. Exposing the $Z_2$-axis allows the user to move between "Realms" in which information can be progressively exposed. Each Realm is represented by a Card 302, 902 along the $Z_2$-axis. In the embodiment of the disclosed method and apparatus shown in FIG. 10, there are only two Realms shown. The first Realm is the Primary Market Realm, which is presented on the Card 302. The second Realm is the "Accounting" Realm presented on a Card 902, in which the user can read information regarding the health of the asset associated with each Object. In accordance with one embodiment of the disclosed method and apparatus, this information is provided in the form of the financial statement for the asset associated with the Object, such as 10K reports, and 10Q reports. In an alternative embodiment, other Realms exist along the $Z_2$-axis, including an Economic Activity Realm, a Derivative Realm, etc.

The Economic Activity Realm contains information regarding the real world operations, such as volume of sales, number of outlets, number of distributors, number of product lines, number of employees, relative sales of each product, new product announcements, etc. The Derivative Realm includes information regarding the derivative assets associated with the Object, such as options or futures. Additional Realms are also contemplated and those skilled in the art are able to identify such additional Realms that would be useful to the user. It should be noted that information that is presented in one Realm may be presented in other Realms as well. That is, the information presented in a particular Realm is not mutually exclusive to that Realm with respect to other Realms.

Figure 11A:
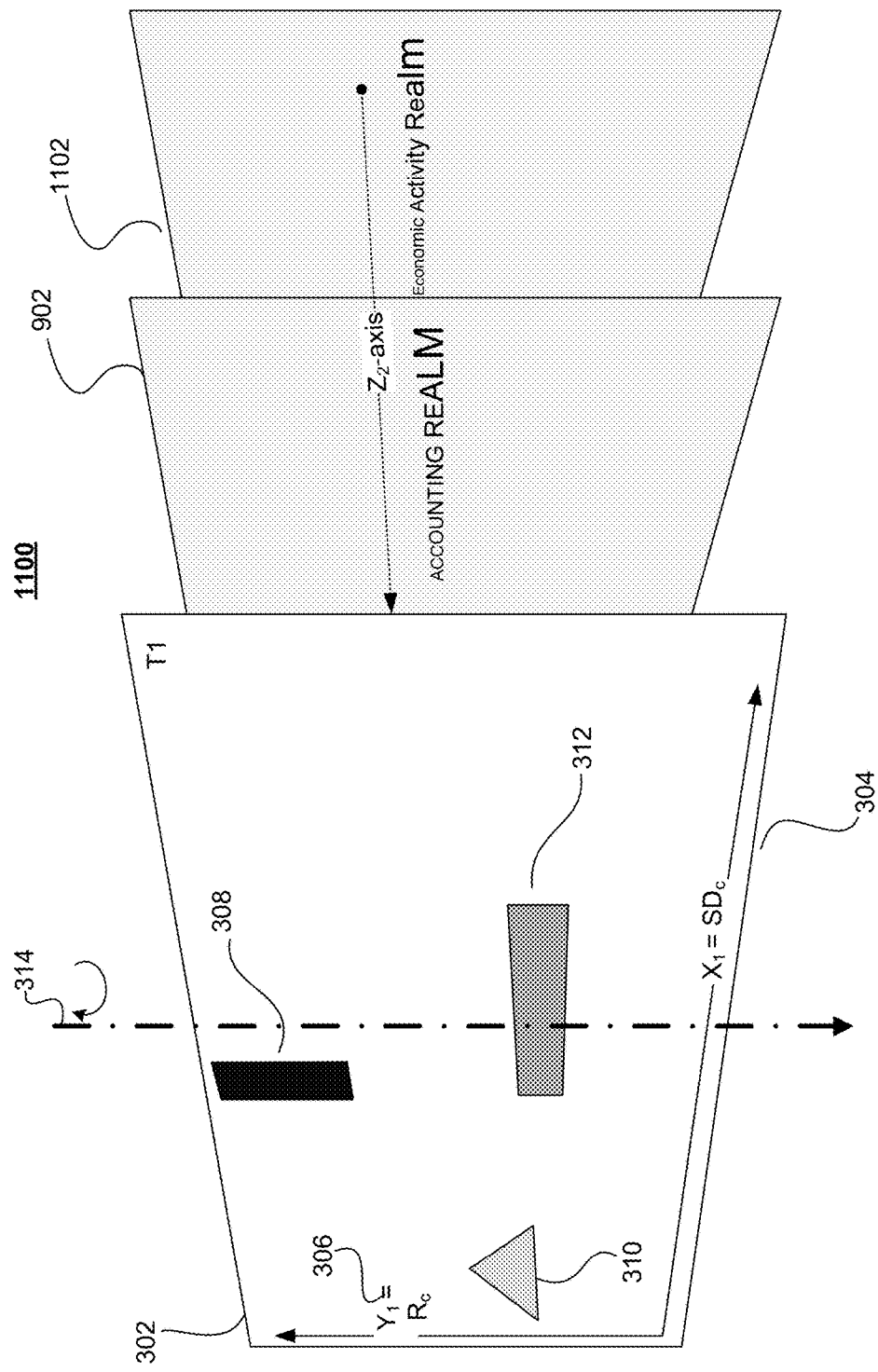
FIG. 11a is an illustration of a Space where the Information dimension is revealed.

In one embodiment shown in FIG. 11a, a representation of three Realms is provided. Each of the three Realms are represented by a Card. A Card 1102 representing the Economic Activity Realm, a Card 902 representing the Accounting Realm and a Card 302 representing the Primary Market Realm and are each displayed on the $Z_2$-axis. With the $Z_2$-axis exposed in the Space 1100, the user can select from among various Realms 302, 902, 1102. The user can select the Accounting Realm 902 by bringing the Card 902 to the front. The user brings the Accounting Realm 902 to the front by putting a finger on the Card 902 and sliding it to the left across the $Z_2$-axis. Once the Accounting Realm 902 is in the front, the user can swipe to the right to rotate the Card 902 to face front.

Figure 11B:
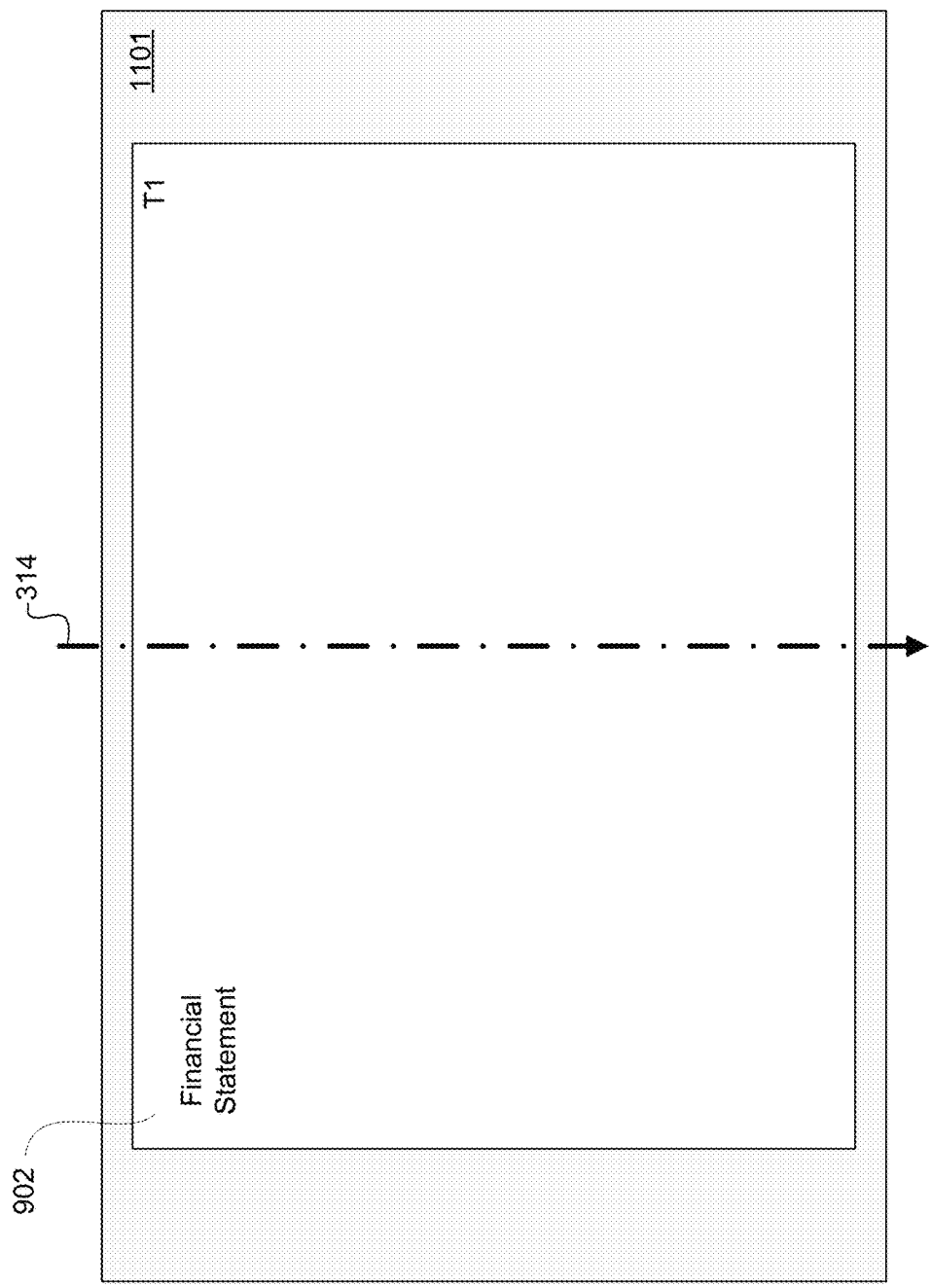
FIG. 11c is an illustration of a Space that is shown after a right swipe from the Space of FIG. 11b.

FIG. 11b shows the Space 1101 that results when the user swipes to the right from the Space 1100 shown in FIG. 11a. The other Cards 1102, 302 will fall in behind the Card 902 and will no longer be exposed. The user can then swipe to the right once again to expose a series of Cards in the Accounting Realm along the $Z_1$-axis. The $Z_1$-axis once again represents time. Accordingly, each Card represents one particular instance of time. By swiping to the right after selecting a particular Realm from the Space 1100, the user can look across time in the selected Realm. The same manipulations can be done with the Primary Market Realm, Economic Activity Realm, etc.

Figure 11C:
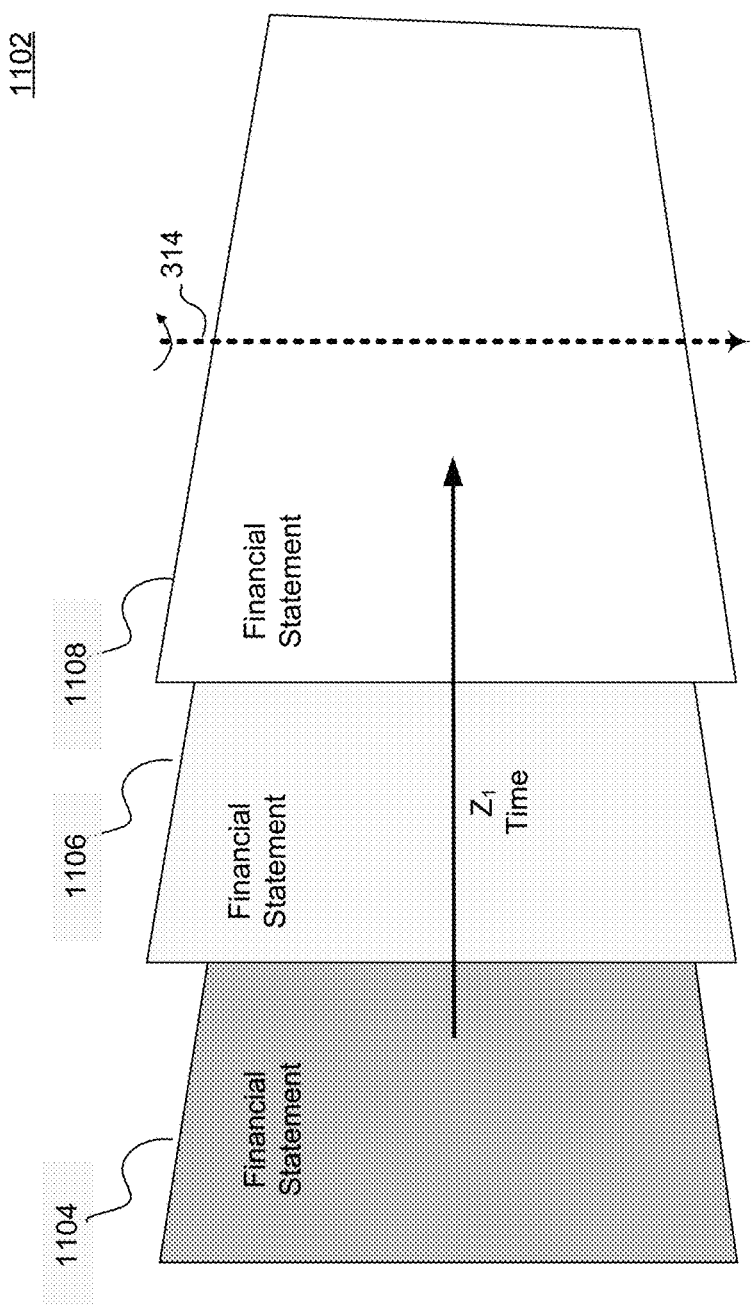
Figure 13:
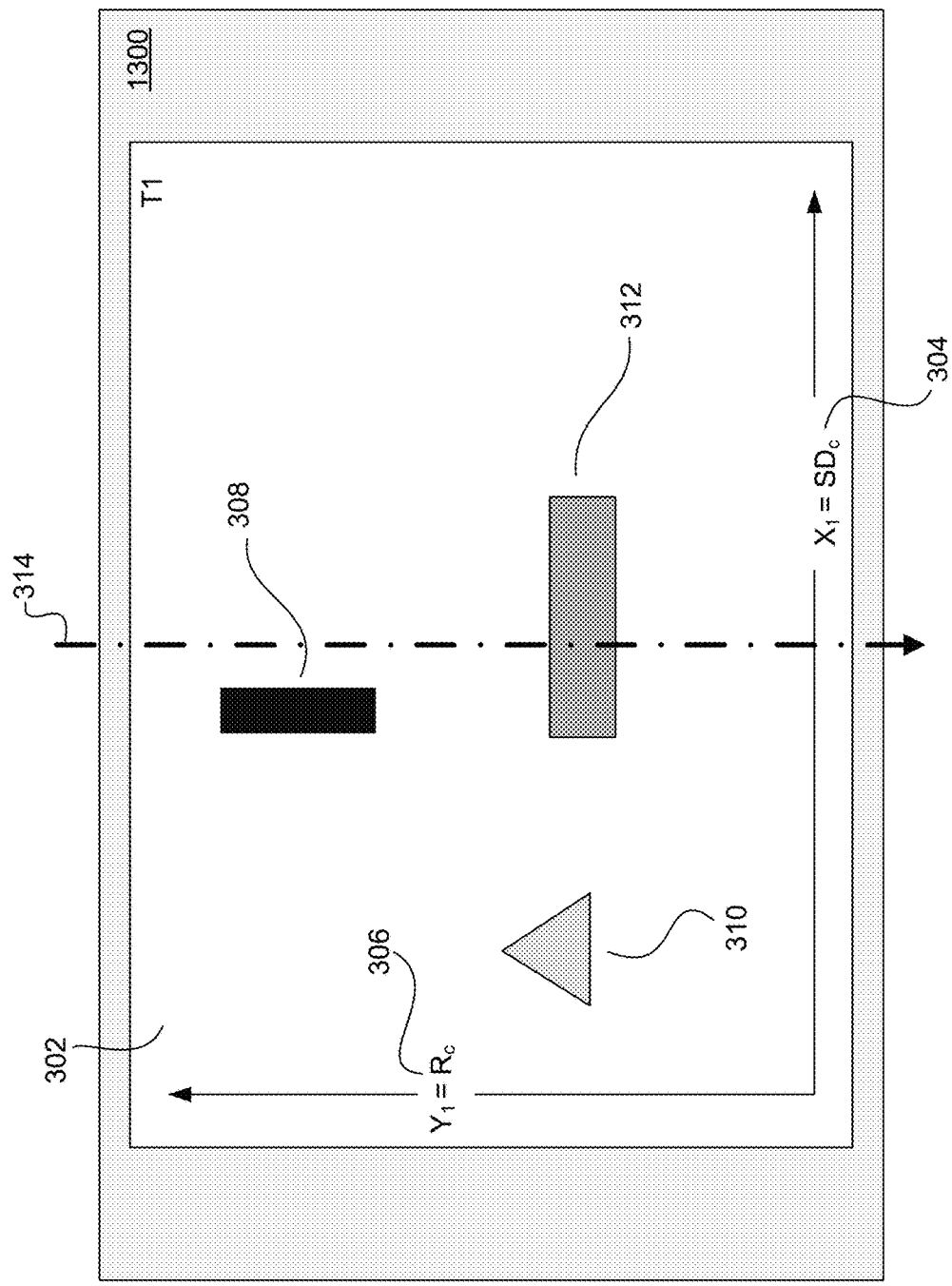
FIG. 13 is an illustration of a Space in the Risk/Return view.

FIG. 11c is an illustration of the result of another right swipe from the Space 1101 of FIG. 11b with the Card 902 representing the Accounting Realm being in front in Space 1101. Each Card 1104, 1106, 1108 shows the financial statement for the asset at a different point in time along the $Z_1$-axis.

From the Space 1000 shown in FIG. 10, the user can swipe to the left. FIG. 12 is an illustration of the Space 1200 that results. The top Card (in the case of the example shown in FIG. 11, the Card 302) rotates counter-clockwise to face forward. The other Card 902 will rotate to face forward as well. The two Cards 302, 902 will then slide together. The information that was previously presented on the two Cards 302, 902 will be merged into a "Sandbox" 1201. The Sandbox allows the user to combine information from various Cards. The user can combine and manipulate the information in the Sandbox. For example, the user can select an Attribute from one Card (such as the book value displayed in the Card 902 for the Object 312) and drag it onto the rectangle whose volume indicates the market value. The result will be a representation of book to market (B/M) value that can be displayed as the ratio of the rectangle 1202 representing book value as a function of the volume of the rectangle 1202, superimposed on the rectangle 312 whose volume represents the market value of the Object 312. For the sake of clarity, only the rectangle 1202 and the Object 312 are shown in FIG. 12. However, additional information may be presented in the Space 1200. A series of Cards showing the changes to the B/M of the Object 312 can be displayed by swiping from left to right three times. The first swipe will return the user to the Space 1000 shown in FIG. 10, but with the B/M value remaining in the Object 312. The second left to right swipe will return the user to the Space 300 shown in FIG. 3, but again, with the B/M value remaining in Object 312. The third left to right swipe will bring the user to the Space 400 shown in FIG. 4. The B/M value of the Object 312 will be carried through to the Space 400. Accordingly, the user will be able to see the change in B/M for the Object 312 over time. For example, the user may wish to validate whether high B/M stocks outperform low B/M stocks. The user can do so by seeing whether those Objects representing stocks with high B/M ratios (i.e., those Objects that have a relatively large interior rectangle 1202 with respect to the exterior rectangle 312) move upward faster than those have relatively smaller interior rectangles. Such upward movement can be seen by comparing those Cards that represent later points in time with Cards that represent earlier points in time along the $Z_1$-axis.

The Sandbox 1201 can be viewed in either the Risk/Return view shown in FIG. 12 or in a spreadsheet view. In the spreadsheet view, the Sandbox has columns for each of the defined Attributes associated with each of the Objects shown in the Risk/Return view. The Sandbox also allows the user to group Objects and to connect Objects. By grouping Objects, the user can create a single composite Object that represents the group of Objects. In this way, the user can observe the group as a single unit. In accordance with one embodiment of the disclosed method and apparatus, the Attributes associated with the composite Object have a value that is the average of the values of the Attributes of the Objects included within the group. For example, the price of the composite Object is the attribute-weighted average of the price for each of the Objects included in the group.

Connecting Objects causes a connection line to be drawn between the connected Objects to allow the user to see how each of the connected Objects is performing with respect to other connected Objects. Connecting Objects allows a user to more easily track the relationship between different Objects. For example, assume a first and second Object are connected. When the connected first and second Object are shown in the risk return plane, the fact that the line is essentially horizontal means that the two Objects (i.e., the financial instruments represented by the Objects) are performing equally well. However, as the connecting line gets more vertical, it is clear that the Object that is higher is performing better than the Object that is lower. The connecting line gives a fast and simple visual that allows the user to detect this relationship.

In accordance with one embodiment, the choices for grouping and connecting Objects will automatically appear when the user touches the Sandbox. In this manner, the Environment is context-sensitive. That is, the Software 20 will guide the user regarding the appropriate gestures to use to manipulate and manage the Objects within each particular Space.

Figure 14:
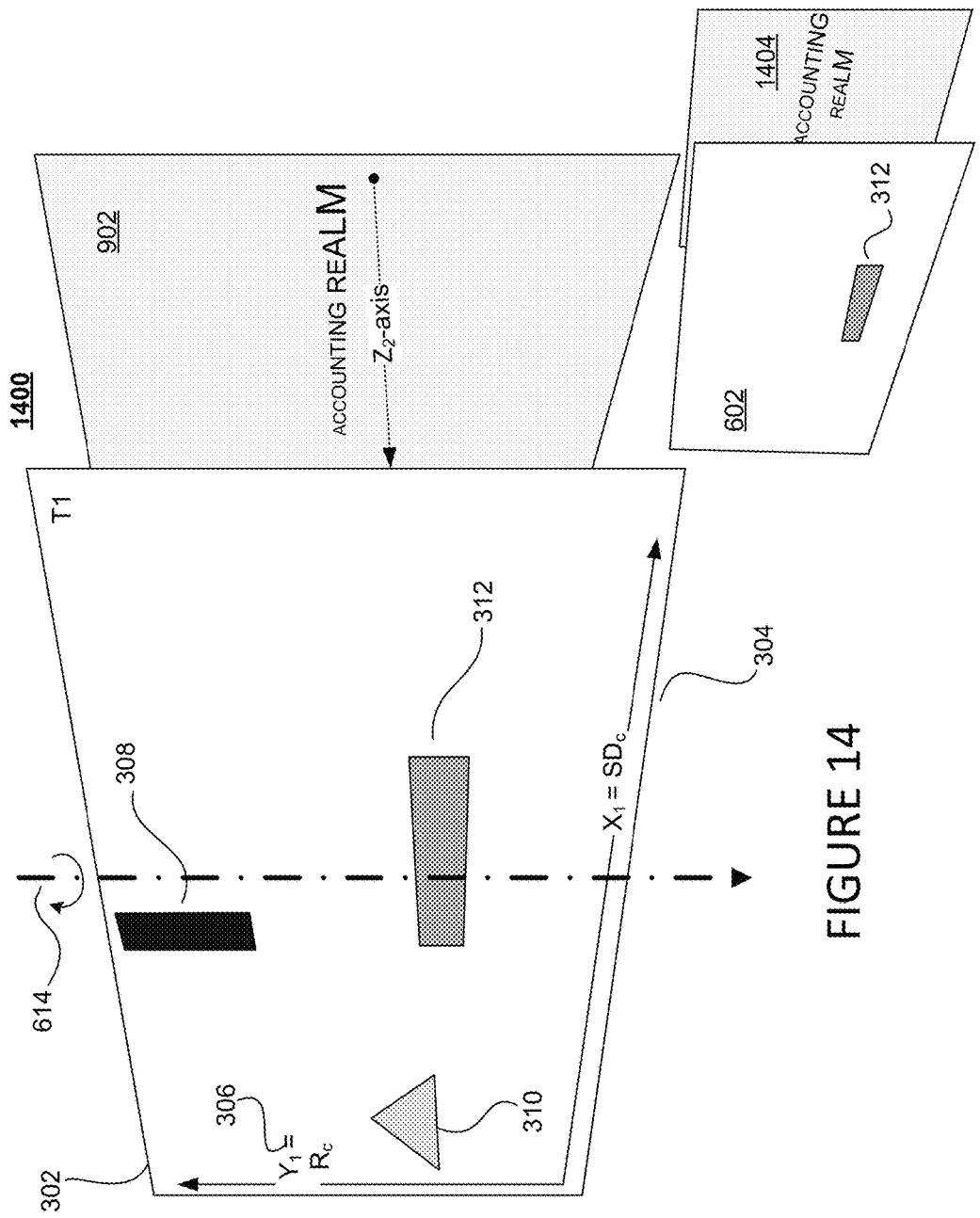

As noted above, tapping on an Object from the Space 300 shown in FIG. 3 will result in the Space 600a being exposed (See FIG. 6a). From the Space 600a, a left swipe will cause the Card 602 to rotate clockwise (looking down) approximately 45 degrees about a vertical axis 614 through the center of the Card 602. FIG. 14 illustrates the Space 1400 that results from this left swipe. The rotation exposes the $Z_2$-axis and additional Cards 1404 that lie along the $Z_2$-axis behind the X-Y plane 602 in the same general manner as occurs when the user swipes left from the Space 600. The Cards 602 and 1404 are presented as smaller than the parent Card 302. In addition, the rotation exposes the Card 902 that was exposed in Space 1000 of FIG. 10. If the left swipe were to have been done from the Space 1100, the Cards representing both Accounting Realm 902 and the Economic Activity Realm 1102 that lie along the $Z_2$-axis behind the Card 302 in FIG. 11a would be exposed.

In addition, in one embodiment, the Cards 602, 1404 are each associated with the corresponding one of the larger "parent" Cards 302, 902, but having information related only to the isolated Object 312 presented in the Space 1400. Accordingly, the Card 602 is an X-Y plane in which placement of the Object 312 along the X-axis indicates risk and placement of the Object 312 the Y-axis indicates return. The Card 1404 is in the Accounting Realm and shows the financial statement of the Object 312. From the Space 1400, the user can select which Realm to bring to the front. If, for example, the user selects to bring the Accounting Realm 902 to the front, then as the user navigates out of the Space 1400, each new Space that the user enters will be associated with the Accounting Realm 902. If the user performs a right swipe from Space 1400 with the Accounting Realm 902 in front, then each of the other Cards will slide behind the Accounting Realm Card 902. In accordance with one embodiment of the disclosed method and apparatus, the financial statement is exposed in the Accounting Realm 902.

Figure 15:
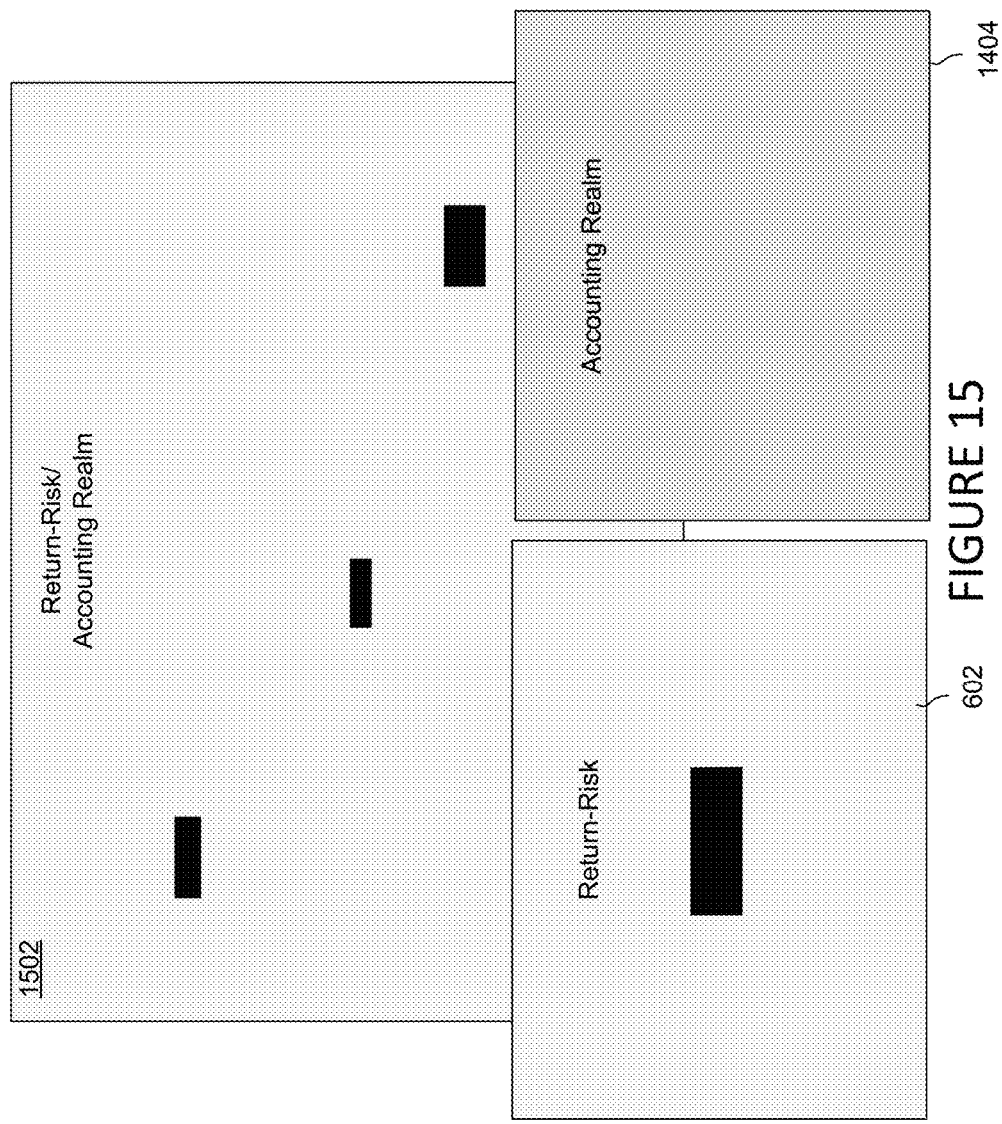
FIG. 15 illustrates a Space that results from a left swipe from the Space shown in FIG. 14.

By swiping left from the Space 1400, the Cards 302, 902 will rotate 45 degrees to face forward. FIG. 15 illustrates the Space 1500 that results from a left swipe from the Space 1400. A Sandbox 1502 is created that is the combination of the information presented on the Card 302 and the Card 902, similar to the Sandbox 1201 created in Space 1200 of FIG. 12. In the Space 1500, the user can combine Attributes from on Card 602 with Attributes from another Card 1404. In accordance with one embodiment of the disclosed method and apparatus, this is done by dragging an Attribute from one Card to an Attribute of the other Card. For example, an Attribute "Book Value" of the Object 312 in the Accounting Realm Card 1404 can be dragged to the Attribute "Market Value" for the Object 312 on the Card 602 to create a new Attribute B/M that indicates the Book-to-Market ratio for the Object 312. The resulting Book-to-Market ratio attribute B/M will be represented on Card 602 and can be dragged to the Sandbox 1502. On dragging the B/M Attribute, the Sandbox 1502 will switch to a spreadsheet view temporarily. Dropping the B/M Attribute in Sandbox 1502 will cause a new B/M column to be created in the Spreadsheet view. The B/M column will have "Book-to-market ratio" as the heading. The value of the B/M Attribute associated with each Object will fill up the corresponding cells in the B/M column. When the operation is finished, the Card 602 will revert to a spatial view. Alternatively, if the B/M attribute is dropped on the Y-axis of the Sandbox 1502, in addition to the above result, the Y-axis will now switch from representing return to representing book-to-market value. The Objects will then be sorted in descending order by Book to Market value.

In addition to allowing a user to navigate the Environment in which each of the described Spaces exist, the disclosed method and apparatus provides a means by which the user can perform simulations and experiments to test out theories and Concepts.

In accordance with one embodiment of the presently disclosed method and apparatus the following interactions occur between the System 170 and Software 20 (for the sake of brevity in this section, referred to collectively as the "The System") on the one hand and the user on the other hand. Initially, The System presents the user with a choice of Concepts to be tested and/or verified. In response, the user selects one of the Concepts presented. The System then presents the user with the initial three-dimensional Space 400 in which the X-axis represents risk, the Y-axis represents return and the $Z_1$-axis represents time. From the Space 400, the user can select the time period of interest. As noted above, the frequency for the Space 400 can be set using a gesture, such as a pinch or spread gesture, and to expand or contract the amount of time between the first and last Card shown in the Space 400 by using the scroll and tap gestures.

The System will then present one or more Realms in the Space 1100 in FIG. 11a. FIG. 11a shows the Primary Market Realm Card 1102 in front. However, the particular Card 302, 902, 1102 that is placed in front depends upon the particular Concept or strategy the user is attempting to apply.

Once the user selects the Concept and time frame, The System shows the appropriate Space, such two-dimensional Space 300 (See FIG. 3) with a number and their associated Attributes. The particular assets and their Attributes are determined based upon the user's initial selection of the Concept to be tested and how the user has progressed through the previous times that the user has selected to test and/or verify that particular Concept. That is, in accordance with one embodiment of the disclosed method and apparatus, The System starts the user with a relatively simple situation in which the Concept is tested and/or verified. If the user performs satisfactorily, The System will advance to a more complex and/or sophisticated situation. In one embodiment of the disclosed method and apparatus, that might involve adding more assets to the Space 300. In another embodiment of the disclosed method and apparatus, the user determines when to advance to a more complex or sophisticated situation.

From the Space 300, the use can select a subset of the assets presented or select all of the assets presented for analysis. The System then presents the selected assets over time. In one embodiment of the disclosed method and apparatus, the assets are shown in the Space 300 as a series of Cards flipping in time to create a movie in which each presented Object 308, 312 changes shape and position to indicate changes in the price, number of outstanding shares, risk and return over the time period selected by the user. In one such embodiment, the sequence of Cards could be run as a repeating loop. Alternatively, the user starts the sequence at the earliest time and the sequence runs to the end of the selected time period, at which time the user can restart the sequence. In one such embodiment, the user may also swipe from left to right to move to Space 400 and view the entire sequence of Cards. If there are more Cards in the sequence than can be presented in the Space 400, then the user can scroll through the Cards from the beginning of the time period to the end of the time period by sliding a finger across the $Z_1$-axis to allow the user to see each of the Cards in the sequence. The user can also use gestures described above to alter or create any Attributes. In addition, in accordance with one embodiment of the disclosed method and apparatus, the user can change the time period between the first Card 408 and the last Card 302 and the amount of time between each Card 302, 402, 404, 406, 408.

In accordance with one embodiment of the disclosed method and apparatus, The System ensures that the user's selection meets a predetermined set of Concept-driven thresholds or conditions. In accordance with one embodiment, The System then generates and renders a statistical model with color feedback ranging from green to red as a spectrum from good to bad, regarding the efficacy and explanatory power of the model. In response, the user can either accept or reject the model and hence the relationship. In accordance with another embodiment, no explicit statistical model is used. Rather, the user is instructed to perform a certain set of actions in accordance with the behavior of the assets through the following presentation.

If the user accepts the model, The System creates a lattice structure between the Objects to represent the model and maintains it unless expressly deleted by the user. The user then simulates investments or asset trades (e.g., stock purchases or sales) within the simulated investing period by dragging the Object 308, 312 over an Object representing the user's portfolio 316. A grid 318 will appear to allow the user to indicate the amount of the investment. The user clicks on the grid 318 to increase the investment by an amount equal to one tile 320, indicated by shading in each of the tiles 320 on the grid 318, one tile 320 for each click. The user may undo the investment by clicking on the shaded tiles 320. The amount of the investment is indicated as the user clicks the tiles 320. The System keeps track of the simulated investments, price resulting positions, calculates and renders the unrealized and realized gains and losses as white and gray tiles 320 on the portfolio grid 318. The user tracks the investments and makes adjustments to maximize the gain on the investment.

At the end of the investment period, The System tallies the final positions, realizes the gains and losses, and reviews the user's performance through the analysis and investing period and compares it to the Concept-driven ideal performance in a graphical manner. The user then observes the investments in light of the theory behind the Concept.

Although the disclosed method and apparatus is described above in terms of various examples of embodiments and implementations, it should be understood that the particular features, aspects and functionality described in one or more of the individual embodiments are not limited in their applicability to the particular embodiment with which they are described. Thus, the breadth and scope of the claimed invention should not be limited by any of the examples provided in describing the above disclosed embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide examples of instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

A group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the disclosed method and apparatus may be described or claimed in the singular, the plural is contemplated to be within the scope thereof unless limitation to the singular is explicitly stated.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described with the aid of block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A system comprising:
   a) hardware, including a processor, the processor including:
      i) a graphics rendering engine;
      ii) a N-dimensional Visualizer and Editor (NDVE), coupled to the graphics rendering engine, the NDVE generating an Environment displayed through the graphics rendering engine, the Environment being displayed as a plurality of N-dimensional Spaces, wherein N is greater than 2, and each Space remains uniform and coherent as the NDVE responds to various gestures executed by the user to expose different information to the user, the NDVE navigating to a fourth of the plurality of Spaces in which lower level assets grouped together to form a higher level asset represented by the higher level Object are each displayed independently as lower level Objects in the fourth of the plurality of Spaces, NDVE further navigating from the fourth of the plurality of Spaces to a fifth of the plurality of Spaces in which a $Z_1$-axis representing time is exposed and a first plurality of Cards are exposed on which the lower level Objects are displayed, each of the first plurality of Cards representing the lower level Objects at a point in time and a second plurality of Cards are exposed on which all other Objects are displayed, each of the Cards of the second plurality representing the other Objects previously displayed in the third plurality of Spaces, each Card of the second plurality of Cards representing a point in time and corresponding with an associated one of the first plurality of Cards;
      iii) a graphical language interpreter, the graphical language interpreter coupled to and receiving information indicating that the user dragged a first Attribute associated with an Object to a second Attribute associated with an Object and the graphical language interpreter responding by interpreting the gesture as a command to divide the value of the first Attribute by the value of the second Attribute to create a new Attribute;
   (b) a display coupled to graphics rendering engine and configured to display the Environment generated by the NDVE, the display having a Z-axis perpendicular to an X-Y plane of the second plurality of Cards, the rotation of the second plurality of Cards revealing the Z-axis, each Card of the second plurality of Cards being associated with a point along the Z-axis that represents a point in time, and a first Card of the second plurality of Cards laid on top of, and obscuring a portion of, a second Card of the second plurality of Cards, the first Card being offset from the second Card to reveal a portion of the second Card; and
   c) a gesture recognition engine configured to provide a first output in response to a first received user gesture and a second output in response to a second received user gesture, the gesture recognition engine coupled to the NDVE, the NDVE being responsive to the first output from the gesture recognition engine by navigating to a fourth of the plurality of Spaces, NDVE further being responsive to the second output from the gesture recognition engine by navigating from the fourth of the plurality of Spaces to a fifth of the plurality of Spaces, and wherein the information indicating that the user dragged a first Attribute associated with an Object is received by the graphical language interpreter from the gesture recognition engine.

2. The system of claim 1, wherein a plurality of X-Y planes are shown across the Z-axis and wherein the gesture recognition engine receives a third gesture from a user to cause the NDVE to adjust the amount of time between adjacent X-Y planes.

3. The system of claim 2, wherein the gesture recognition engine receives a fourth user gesture to cause NDVE to adjust the amount of time between the first and last X-Y plane displayed.

4. The system of claim 2, wherein each X-Y plane is displayed as a Card.

5. The system of claim 4, wherein the gesture recognition engine generates a fifth output in response to receiving a fifth user gesture and the NDVE responds to the fifth output by navigating from the second of the plurality of Spaces to a third of the plurality of Spaces, the third Space being a two-dimensional Space in which each of the Cards are turned ninety degrees about their respective Y-axes and the NDVE plots a line starting at the position of a first Object located on the first Card and through the position of the first Object on each other Card.

6. The system of claim 1, wherein each Object represents information about a financial asset.

7. The system of claim 6, wherein the information represented by the Object includes at least one of: the type of asset, the price of the asset, the number of outstanding shares if the asset is an equity, the risk associated with the asset and the return on investment associated with the asset.

8. The system of claim 7, wherein in response to a user gesture associated with a higher level Object displayed in the first of the plurality of Spaces, the NDVE navigates to a fourth of the plurality of Spaces in which lower level assets grouped together to form a higher level asset represented by the higher level Object are each displayed independently as lower level Objects in the fourth of the plurality of Spaces.

9. The system of claim 8, wherein the gesture recognition engine receives a user gesture and in response instructs the NDVE to navigate from the fourth of the plurality of Spaces to a fifth of the plurality of Spaces, at least one of the Cards of the second plurality of Cards rotating to face forward in the fifth Space and at least two of the Cards of the first plurality of Cards rotating to face forward in the fifth Space and spread out across the bottom of the fifth Space.

10. The system of claim 1, wherein the system further comprises a concept modeler and a simulation engine, and wherein the NDVE presents a user with a choice of Concepts to be tested, and in response to a selection by the user, presents the user with a two-dimensional Space in which the X-axis represents risk and the Y-axis represents return, and wherein the concept modeler maintains a repository of axioms and defined rules that define financial Concepts, and wherein the simulation engine performs operations associated with selected Concepts in response to user gestures received by the gesture recognition engine.

11. The system of claim 10, wherein the simulation engine provides animation to the NDVE to animate Objects within the Space to cause the Objects to move in response to changes in the values of various Attributes associated with the Objects.

12. The system of claim 1, wherein the system further includes an Audio Renderer.

13. The system of claim 1, wherein the system further comprises a data computation and transformation engine.

14. The system of claim 1, wherein the system further comprises a position location module.

15. The system of claim 1, wherein the system further comprises an audio navigator module.

16. The system of claim 1, wherein the system further comprises a database engine.

17. The system of claim 1, wherein the system further comprises an interaction engine.

* * * * *